US009369667B2

(12) United States Patent
Diao

(10) Patent No.: US 9,369,667 B2
(45) Date of Patent: Jun. 14, 2016

(54) CONVEYING GAZE INFORMATION IN VIRTUAL CONFERENCE

(71) Applicant: Jie Diao, Fremont, CA (US)

(72) Inventor: Jie Diao, Fremont, CA (US)

(*) Notice: Subject to any disclaimer, the term of this patent is extended or adjusted under 35 U.S.C. 154(b) by 440 days.

(21) Appl. No.: 13/842,658

(22) Filed: Mar. 15, 2013

(65) Prior Publication Data

US 2013/0271560 A1 Oct. 17, 2013

Related U.S. Application Data

(60) Provisional application No. 61/686,713, filed on Apr. 11, 2012.

(51) Int. Cl.
*H04N 7/14* (2006.01)
*H04N 7/15* (2006.01)
*H04L 12/18* (2006.01)

(52) U.S. Cl.
CPC .............. *H04N 7/15* (2013.01); *H04L 12/1827* (2013.01)

(58) Field of Classification Search
USPC ................... 348/14.01–14.16; 370/259–271, 370/351–357; 379/202.01–207.01; 709/201–207, 217–248
See application file for complete search history.

(56) References Cited

U.S. PATENT DOCUMENTS

| | | | | | |
|---|---|---|---|---|---|
| 4,400,724 | A | * | 8/1983 | Fields | H04L 12/1813 348/14.1 |
| 7,679,638 | B2 | * | 3/2010 | Eshkoli et al. | 348/14.08 |
| 8,558,868 | B2 | * | 10/2013 | Prentice | 348/14.08 |
| 8,848,020 | B2 | * | 9/2014 | Abate et al. | 348/14.07 |
| 9,014,059 | B2 | * | 4/2015 | Richardson | H04L 65/1006 370/261 |
| 2004/0008249 | A1 | * | 1/2004 | Nelson et al. | 348/14.09 |
| 2004/0139155 | A1 | | 7/2004 | Miller et al. | |
| 2005/0099492 | A1 | * | 5/2005 | Orr | 348/14.08 |
| 2006/0098085 | A1 | * | 5/2006 | Nichols et al. | 348/14.07 |
| 2009/0033737 | A1 | | 2/2009 | Goose et al. | |
| 2009/0244257 | A1 | | 10/2009 | MacDonald et al. | |
| 2010/0205540 | A1 | | 8/2010 | Gupta et al. | |
| 2012/0274736 | A1 | * | 11/2012 | Robinson et al. | 348/14.16 |
| 2014/0022332 | A1 | | 1/2014 | Wang et al. | |

FOREIGN PATENT DOCUMENTS

WO 2011/136792 A1 11/2011

OTHER PUBLICATIONS

KIPO International Search Report, corresponding to PCT/US2013/036004, Jul. 26, 2013, 2 pages.

* cited by examiner

*Primary Examiner* — Hemant Patel
(74) *Attorney, Agent, or Firm* — Innovation Counsel LLP

(57) ABSTRACT

A system and a method for executing a virtual conference are presented. The method includes providing, to each participant, images of the plurality of nodes, receiving an active node selection input from a first participant of the plurality of participants, the active node selection input indicating which of the plurality of nodes the first participant selects as an active node for communication, and modifying an image quality of the active node provided to the first participant, so that the active node has a first image quality that is different from a second image quality that is assigned to other nodes, wherein image quality includes parameters that affect the perceived clarity of an image. Also provided is a system and method for obtaining the image of a participant from a desired angle by guiding the participant's gaze to a selected region of the screen relative to a camera.

15 Claims, 28 Drawing Sheets

CONVEYING GAZE INFORMATION IN VIRTUAL CONFERENCE

CROSS REFERENCE TO RELATED PATENT APPLICATION(S)

This application claims the priority and benefit of U.S. Provisional Application No. 61/686,713 filed on Apr. 11, 2012, titled "Enhancements to Conveying Gaze Information in Virtual Conference," the entire contents of which are incorporated herein by reference.

FIELD OF INVENTION

The present disclosure relates generally to virtual conferencing and more particularly to virtual conferencing capable of conveying gaze information.

BACKGROUND

Virtual conferencing in the form of video conferencing has become widely available in the past decade. Video conferencing provides a convenient way for participants to "meet" without traveling to be physically together. In addition to saving time and cost associated with traveling, video conferencing is environmentally friendly, as it should help avoid unnecessary driving and flying. In spite of the above advantages, video conferencing is under-utilized today and people still travel distances for face-to-face meetings. This is because many people find video conferencing to be a poor substitute for face-to-face meetings.

One of the reasons video conferencing is unsatisfactory is the loss of eye contact and gaze information. Studies have shown that spatial distortions of eye contact have a negative impact on effective communication in video conference. Conference participants like knowing who is focusing on whom and if anyone is focusing on them, and lack of these information makes video conferencing impersonal, uncomfortable, and ineffective for many people. Moreover, absence of eye gaze information can even lead to miscommunication. For example, in a video conference with multiple people, it is sometimes difficult to tell exactly whom the speaker is talking to. When the speaker asks, "Could you handle that?" at the end of a long job description, multiple people could assume that they are each being asked to handle the job. The possibility of this type of miscommunication leads people to avoid handling important communication via a video conference, forcing them to travel.

Ideally, a video conference system should allow participants to interact with one another, select whom or what they want to focus on, and know who is interacting with whom. However, most existing video conferencing systems do not offer such features. Instead, the existing video conferencing systems typically deliver videos the same way to each participant, usually at the maximum allowable resolution and frame rate. In particular, the existing systems do not allow participants to customize their interactions with other participants, or view the interactions between other participants. As a result, interaction among the participants is limited in existing video conferencing systems.

Although some existing video conferencing systems can deliver videos of participants based on the participants' activity level (e.g., detecting a certain voice level and subsequently delivering video of that speaker to the participants), nevertheless it is the video conferencing systems, rather than the participants, that determine the source of the videos and how those videos are delivered. Furthermore, confusion can arise when several participants speak at the same time, because the video conferencing systems may not be able to differentiate to which individuals the various communications are directed. This makes it difficult for participants to determine who is talking to whom (or who is focusing on whom), or what another participant is focusing on. For example, when a first participant says "hello," the same "hello" video will be delivered to the terminals of the other participants and displayed the same way on their screens. None of the other participants can be sure who the first participant is actually speaking to. This confusion makes video conference less natural because participants often need to guess the direction of communications, which limits the level of interaction among the participants during the video conference.

As such, there is a need for a virtual conferencing system that is capable of conveying accurate gaze information to the participants.

SUMMARY

In one aspect, the inventive concept pertains to a computer-implemented method of executing a virtual conference among a plurality of nodes, wherein some or all of the plurality of nodes are associated with a plurality of participants in the virtual conference. The method includes providing, to each participant, images of the plurality of nodes, receiving an active node selection input from a first participant of the plurality of participants, the active node selection input indicating which of the plurality of nodes the first participant selects as an active node for communication, and modifying an image quality of the active node provided to the first participant, so that the active node has a first image quality that is different from a second image quality that is assigned to other nodes, wherein image quality includes at least one of resolution, brightness, contrast, sharpness, tone, noise level, and frame rate of an image.

In another aspect, the inventive concept pertains to a computer-implemented method of executing a virtual conference among a plurality of nodes, wherein some or all of the plurality of nodes are associated with a plurality of participants including a first participant. The method includes obtaining a front facial image of the first participant, obtaining a side facial image of the first participant, receiving an active node selection input from the first participant indicating which of the plurality of nodes the first participants desires to focus on for communication, and transmitting the front facial image of the first participant to one of the plurality of nodes corresponding to the selected active node and transmitting the side facial image of the first participant to other nodes of the plurality of nodes.

In yet another aspect, the inventive concept pertains to a computer-implemented method of executing a virtual conference among a plurality of nodes, wherein some or all of the plurality of nodes are associated with a plurality of participants including a first participant. The method includes receiving an active node selection input from the first participant indicating which of the plurality of nodes the first participants desires to look at, and adjusting a placement of an image of the active node that is displayed to the first participant relative to a position of a camera that is configured to capture an image of the first participant, to capture the image of the first participant from a desired facial angle.

DETAILED DESCRIPTION

The present disclosure pertains to a method and system that delivers information to participants in a virtual conference based on the participants' preferences and selection (specifically, whom or what the participants want to focus on). The information further includes accurate gaze information of the participants. Although the invention will be described in the context of a virtual conference, it will be understood that this is not a limitation of the invention and the concepts disclosed herein can be adapted to other applications, such as virtual games or image display.

Spatial faithfulness can be defined at different levels. With Mutual Spatial Faithfulness, participants are able to see when someone else is paying attention to them or not. With Partial Spatial Faithfulness, a participant is able to tell the general direction of someone's attention. With Full Spatial Faithfulness, a participant is able to correctly perceive the specific object of someone's attention. This inventive concept disclosed herein pertains to preserving spatial faithfulness in a video conference by 1) guiding the gaze of conference participants to capture images that reflect gaze information of each participant, and 2) synthesizing and displaying views that create a sense of reality to the conference participants with respect to gaze information.

Figure 1A:
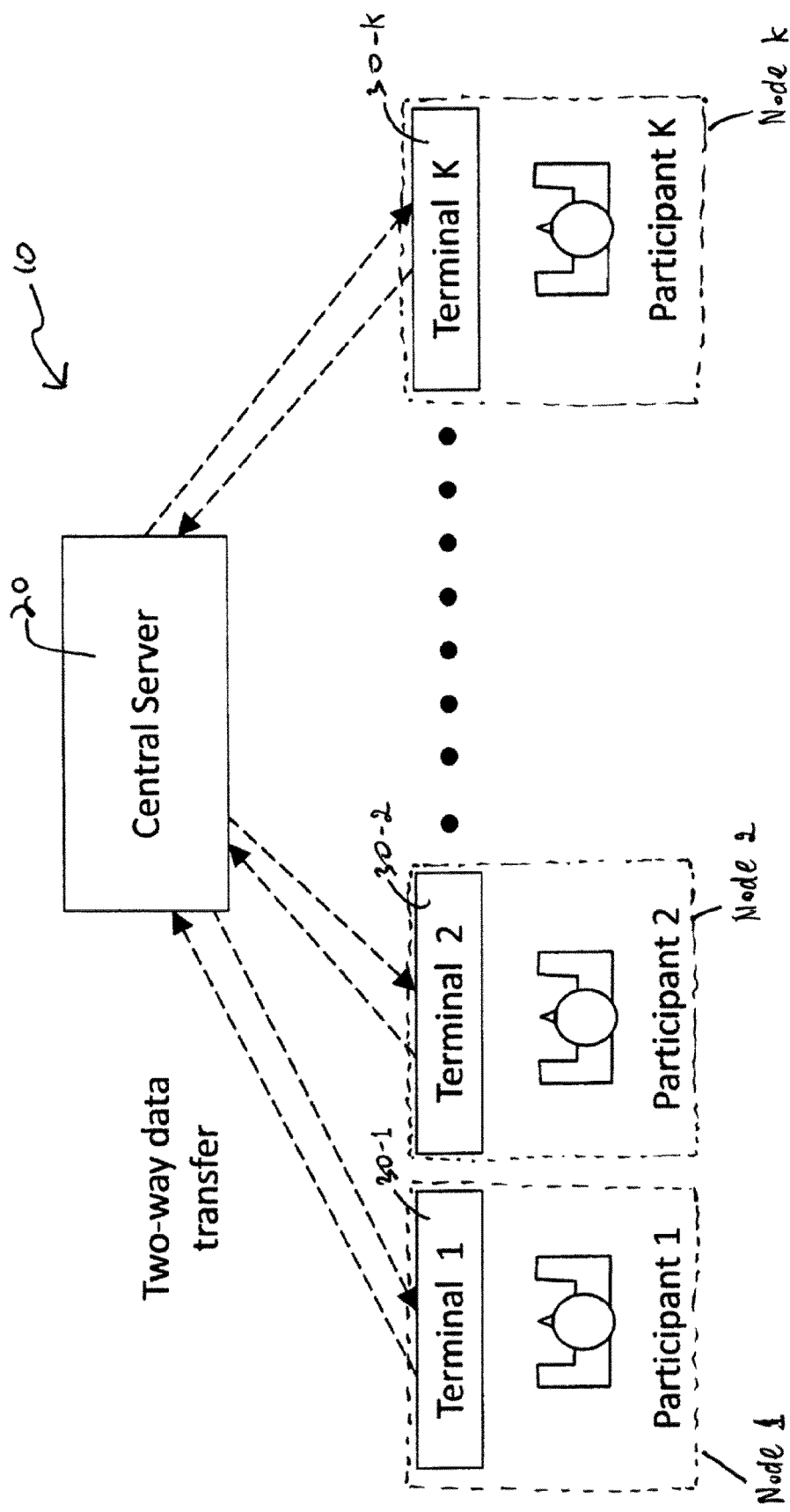
FIGS. 1A, 1B, and 1C depict embodiments of a virtual conference system in accordance with the invention.

FIG. 1A depicts a virtual conference system 10 of the invention. A "conference," as used herein, is intended to include any type of meeting or exchange and is not limited to a formal business meeting. A "virtual conference" is intended to include any type of meeting or exchange that does not require participants to be in the same physical location, such as a video conference. As shown in FIG. 1A, the virtual conference system 10 includes a central server 20 and a plurality of terminals 30.

The central server 20 can include a web server, an enterprise server, or any other type of computer server, and can be computer programmed to accept requests (e.g., HTTP, or other protocols that can initiate data transmission) from a computing device and to serve the computing device with requested data. In addition, the central server 20 can be a broadcasting facility, such as free-to-air, cable, satellite, and other broadcasting facility, for distributing data.

The terminals 30 can include a room system, a desktop computer, a laptop, a tablet, a smartphone, or any other device capable of capturing, displaying, and transmitting visual data and audio data. Each terminal 30 is equipped with audio and video input and output devices, and each terminal 30 may have a participant. A "participant" may be a human being, a robot, a virtual cartoon figure, an inanimate object, etc. The video input/output devices at the terminals 30 allow the participants to see each other, and the audio input/output devices at the terminals 30 allow the participants to hear each other. The terminals 30 may be at remote geographical locations (e.g., different cities), although this is not a limitation of the invention.

The virtual conference system 10 may include a plurality of nodes. Each terminal 30 in the virtual conference system 10 corresponds to a "node." If a "terminal 30" is followed by a number or a letter, it means that the "terminal 30" corresponds to a node sharing the same number or letter. For example, as shown in FIG. 1A, terminal 30-1 corresponds to node 1 which is associated with participant 1, and terminal 30-k corresponds to node k which is associated with participant k.

A "node" is a logically independent entity in the virtual conference system 10. Therefore, the plurality of nodes in the virtual conference system 10 can represent different entities.

For example, a node may be associated with a conference participant, a projection screen, a white board, an empty seat, or even an empty space. A node may also be a simulation of a video conference terminal from another system, thereby allowing participants using different systems to engage in a conference. A node may correspond to multiple objects. For example, a projection screen and a white board can share the same node. In such a case, a conference participant can select whether to display the projection screen and/or white board on his terminal 30. Not every node corresponds to a terminal 30, however. For example, the white board node may be a board that is generated by the central server 20.

Referring to FIG. 1A, the bi-directional arrows between the central server 20 and each terminal 30 indicate two-way data transfer capability between the central server 20 and each terminal 30. The terminals 30 can communicate with one another via the central server 20. For example, both visual data and audio data may be transmitted to/from the terminals 30 and the central server 20, and among the terminals 30.

The central server 20 collects (visual and/or audio) data from each terminal 30, and generates an appropriate custom view to present at each of the other terminals 30. The views are customized independently for each terminal, and may preserve mutual, partial, and even full spatial faithfulness and non-verbal cues, depending on the embodiment and as described in more detail below. Hence, the effectiveness of communication in the conference can be similar to that of a face-to-face meeting.

Figure 1B:
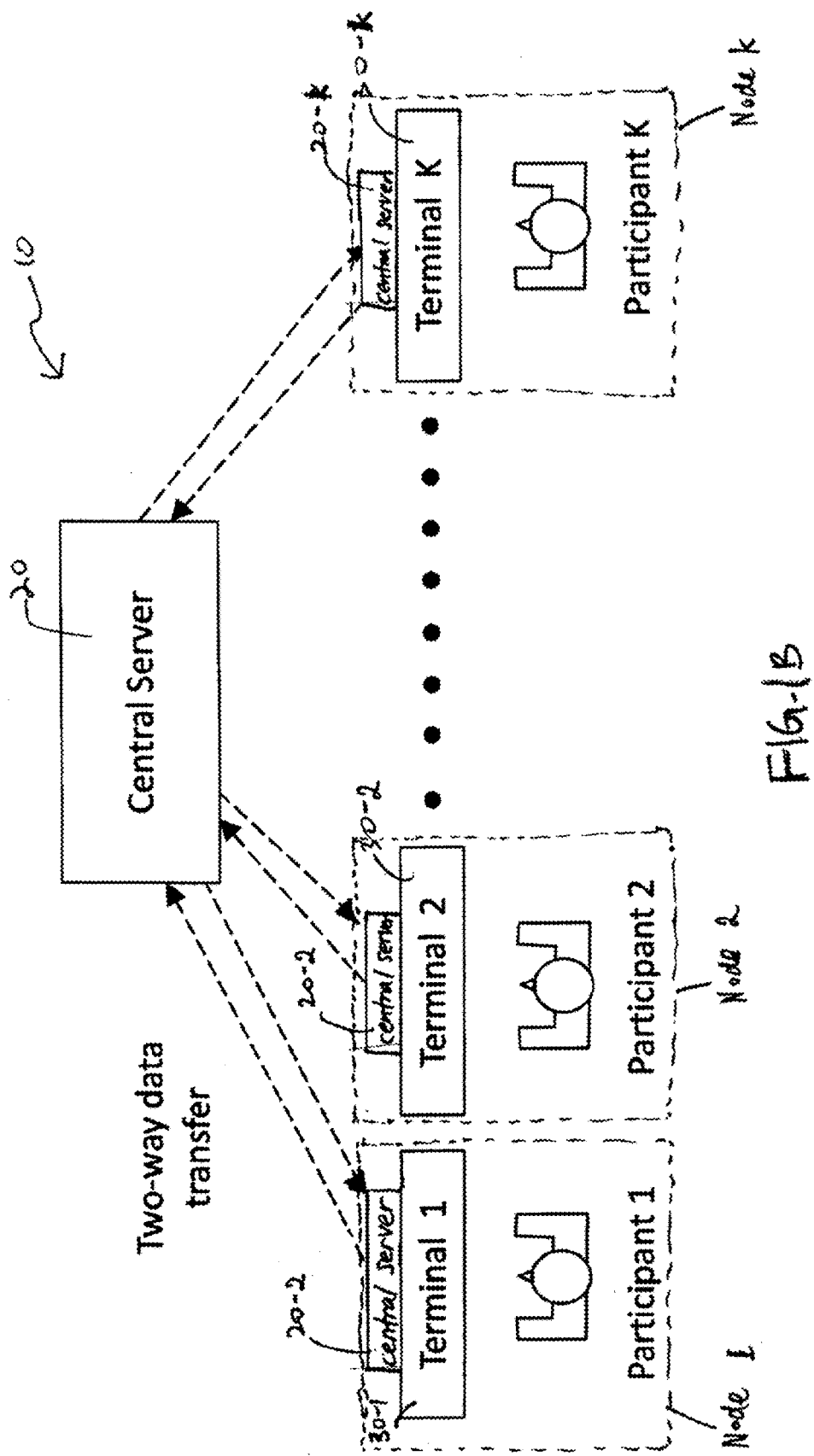

FIG. 1B is another embodiment of the virtual conference system 10, and illustrates that the central server 20 does not have to be one physical unit at one location. The central server 20 is defined by its processing capability, and can thus be partially remote to the terminals 30 and partially located at the terminals 30. For example, as shown in FIG. 1B, the system 10 can further include a plurality of central servers (20-1, 20-2, . . . , 20-k) located at respective terminals (30-1, 30-2, . . . , 30-k), in addition to a central server 20.

Figure 1C:
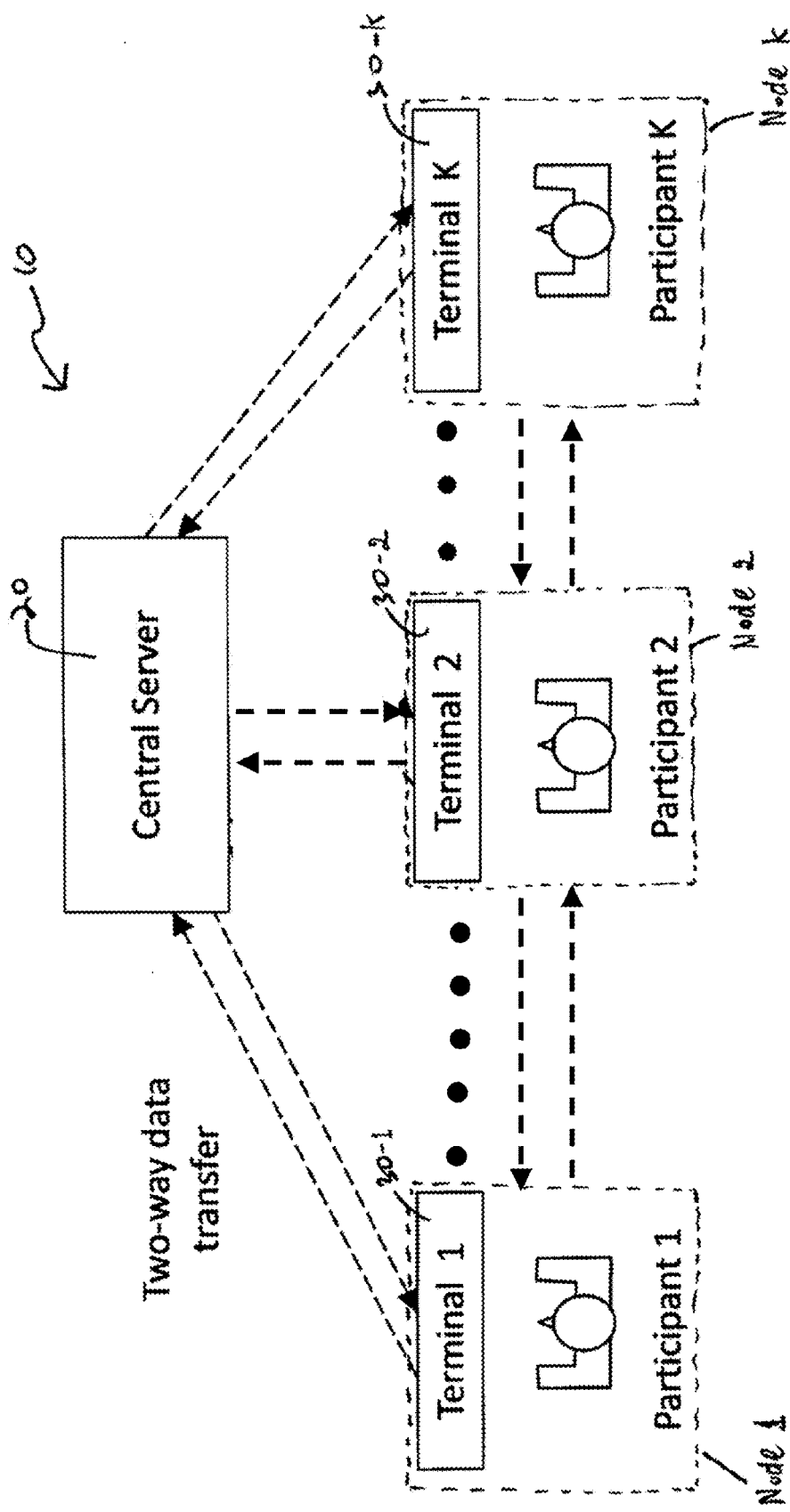

FIG. 1C is yet another embodiment of the virtual conference system 10. Unlike the embodiments of FIG. 1A and FIG. 1B, which employ a client-server architecture, the embodiment of FIG. 1C employs a peer-to-peer communication channel by which terminals 30 can directly communicate without passing through the central server 20. The peer-to-peer communication channel helps reduce the load on the central server 20 by utilizing the resources (e.g., bandwidth, storage space, processing power) of the network participants (terminals 30). Although not explicitly shown, the peer-to-peer communication channel may be added to the embodiment of FIG. 1B where the central server 20 is not in one location. The peer-to-peer channel may be especially useful in certain situations, such as in a two-participant conference where the active node is constant.

The inventive concept disclosed herein pertains to a system that is capable of collecting accurate gaze information from participants. The system presents each participant with the option of focusing on one of the nodes or choosing to focus on nothing. More specifically, the system presents the nodes at a low image quality except the active node, if any is selected. If a participant selects an active node, the active node is displayed at a high image quality while the rest of the nodes remain displayed at low image quality. Only one node can be selected as the active node at a given time. This way, the system (e.g., the central server 20) is able to monitor whom each participant is focusing on at a given time, in real time.

The system is also able to convey the collected gaze information to conference participants. This information is conveyed by controlling the manner in which the nodes are displayed at the terminals 30. In one embodiment, visual cues such as coloring and thumbnail images are used to convey information about which peer participants are looking at whom. In another embodiment, "watching me" and "watching elsewhere" images of a participant, along with adjustment of the positions of the participants on the screen, is used to convey the information about who looking at whom. For example, providing a "looking to the right" image of participant A and dynamically moving participant B's image to the right of participant A will convey the information that participant A is focusing on participant B. As used herein, a front facial image corresponds to a "watching me" image of a participant, and a side facial image corresponds to a "watching elsewhere" image of a participant where the participant is not looking squarely in the direction of the camera.

The system also guides a participant's gaze by dynamically adjusting the layout of images on screen. Specifically, the system guides the participant's gaze to an area near a camera to capture a "watching me" image, and guides the participant's gaze away from the camera to capture a "watching elsewhere" image. In an embodiment with multiple cameras (physical imaging devices), the active node is moved to the core region so the core camera will capture the "watching me" image and a non-core camera will capture the "watching elsewhere" image at the same time. In an embodiment with a single physical camera, the system will move the active node to the core region in two terminals if the participants at the two terminals select each other as their active nodes. This way, the cameras at the two terminals will capture "watching me" images of the two participants and transmit them to each other, enabling the participants to establish eye contact.

In the case where two participants have established eye contact, the system arranges the active nodes to capture "watching me" images of the participants that are engaged with each other. If there is a core camera and a non-core camera, a third participant can receive a "watching elsewhere" image captured by a non-core camera. However, if there is only one physical camera that is taking the "watching me" image, the third participant will receive a "watching me" image even though he is not really being focused on, because only one image is taken. To avoid misleading the third participant into thinking that he is being focused on, the image may be manipulated (for example by Algorithm D of FIG. 8, described below).

In the case where no eye contact is established between any participants (e.g., participant A is watching participant B and participant B is focusing on participant C), no "watching me" image will be captured. If participant A has only one camera at his terminal, the system will move participant A's active node to a non-core region (away from the camera) to capture the "watching elsewhere" image of participant A that can be distributed to other participants. In this case, the only participant who would not be receiving an accurate image would be participant B, who is actually being focused on by participant A. To avoid misleading participant B, the image may be manipulated to convey to participant B that he is being focused on.

There are a number of ways in which a participant may select an active node. Techniques such as manual intervention, automatic detection, or a combination of the two are contemplated. Manual intervention includes the participant's selecting a node by clicking on the image corresponding to the node using a mouse or touching the image corresponding to the node on a touchscreen. Automatic detection includes selecting a node using eye gaze tracking methods or brain waves transmission. Selection of the active node can be visual, auditory, or tactile. For example, the active node selection input from the participant can be received in any form, including acoustic, speech, brain waves, other physiological input, eye movements, gestures, body movements, or tactile input.

Numerous techniques are contemplated for conveying gaze information to a participant. In one embodiment, color coding and thumbnail images may be used, as will be described in more detail below, for example in reference to FIGS. 14 and 15. In an embodiment with a core camera and a non-core camera, a participant's gaze is guided toward the core camera and the two cameras capture "watching me" and "watching elsewhere" images, respectively, as will be described in more detail below in reference to FIGS. 2-6 and 10-13. The central server 20 receives the active node selection information from all the participants and transmits the correct image (watching me v. watching elsewhere) to each of the participants to convey the right information. In another embodiment (described below in reference to FIGS. 16-25) with a single camera, positions of the active nodes are adjusted to capture "watching me" images when two participants have established eye contact, and active nodes are dynamically moved away from the camera where no eye contact is established. The images are manipulated for participants who would not be receiving the correct gaze information from the captured image. Color coding and thumbnail images may be used with any of the above embodiments.

Figure 2:
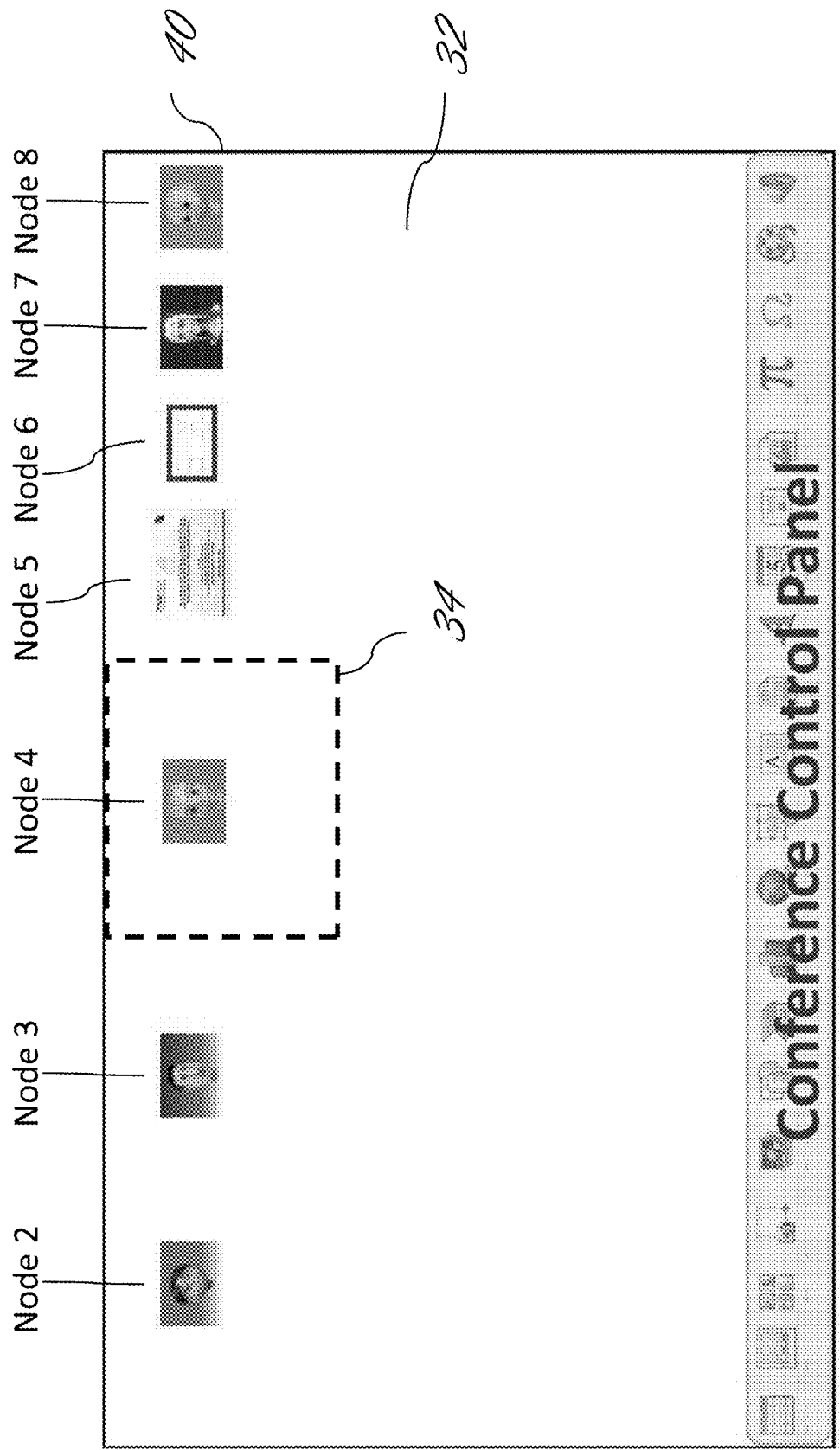
FIG. 2 depicts an exemplary view that is displayed at terminal 30-1 when participant 1 is not focusing on any node.

FIG. 2 depicts an example of what may be shown on the video input and output device at terminal 30-1 of FIG. 1, as viewed by participant 1 during a conference according to some embodiments of the invention. The video input and output device may include a display device, such as a computer display or a display of a mobile phone, tablet, etc. The display device is capable of displaying images, and a frame of images that are displayed on the display device is herein referred to as a "screen." An "image" may include a video, a photograph, or a data file that is being shared in the conference (e.g., PowerPoint™ presentation slides, or notes written on an electronic white board).

As shown in FIG. 2, a screen 40 includes a conference region 32 which is a virtual space constructed by central server 20. Images of the nodes in the conference are displayed in the conference region 32. As shown in FIG. 2, images of nodes 2-8 are arranged in a tile-like configuration on a top portion of the conference region 32, with the nodes arranged in numerical order from left to right. The arrangement of the images of the nodes, however, is not limited to the above configuration, and can be ordered in different ways within the conference region 32.

In the example of FIG. 2, participant 1 is a host participant since participant 1 is at terminal 30-1. A "host participant" is a conference participant who is viewing other conference participants on his display device. Participants 2, 3, 4, 7, and 8 are peer participants. A "peer participant" is a conference participant who is not the host participant. Also, a "peer participant," as used herein, will refer to a human participant, and is to be distinguished from an inanimate object (such as a projection screen).

As previously described, a node is a logically independent entity in the virtual conference system 10, and each node can represent a different entity. Referring to FIG. 2, nodes 2, 3, 4, 7, and 8 correspond to the peer participants (participants 2, 3, 4, 7, and 8, respectively), node 5 corresponds to a projection screen, and node 6 corresponds to a white board. Node 1 is not shown in the conference region 32 because the view from terminal 30-1 is constructed to emulate the view that participant 1 might see if he were sitting in a physical space. As such, in this particular embodiment, participant 1 will not see his own image on the display device at terminal 30-1. Likewise, the host participants at the other terminals will not see their own images on the display devices at their respective terminals. For example, participants 2, 3, 7, and 8 will not see their own images on the display devices at terminals 30-2, 30-3, 30-7, and 30-8, respectively.

In some other embodiments, a host participant may be able to see his own image on the display device of his terminal. For example, in those embodiments, a host participant may see his own image displayed in a conference region (e.g., conference region 32) on the display device at his terminal (e.g., terminal 30). This allows the host participant to see his own image, as viewed by other participants on the display devices at their terminals during the conference. In some instances, the display of his own image can indicate to the host participant whether his image has been properly transmitted to the other nodes. For example, if the host participant's image fails to display on his terminal, it may indicate to the host participant of a loss in network connectivity between the host participant's node and the other participants' nodes.

Next, the delivery of the images of the nodes according to some embodiments will be described and contrasted with the delivery of images in existing video conferencing systems. As previously mentioned, existing video conferencing systems typically deliver images of the same quality to each participant. "Image quality," as used herein, is intended to mean parameters that may affect bandwidth consumption and/or the perceived clarity of the end image by a viewer, including but not limited to resolution, frame rate, brightness, contrast, sharpness, tone, and noise level at which the image is displayed. Hence, where there is a "first image quality" and a "second image quality," the two image qualities differ in at least one of resolution, frame rate, brightness, contrast, sharpness, tone, and noise level. This is different from a typical system in which participants are usually not able to choose how the images are delivered and images are typically delivered in highest possible quality to all the participants. The inventive concept disclosed herein recognizes that delivery of high quality images to all the participants is not always necessary, and selectively using different image qualities can result in significant conservation of bandwidth and network resources without compromising user experience. This is because human eyes are highly sensitive to details in shapes and images only within a limited angle ("critical angle"). When a participant focuses on an image on a display screen, the richness and quality of the image typically matters most within the scope of the participant's critical angle. For images displayed outside the scope of the critical angle (i.e., in the participant's peripheral view), the details and quality of those peripheral images may not matter significantly since they may not be readily perceived or appreciated by the participant.

The embodiments according to the invention can allow a participant to select an image of a node that the participant wants to focus on. The embodiments can also address the above-described bandwidth congestion problem by adjusting or modifying the image quality of the nodes based on a participant's preference and selection. For example, a host participant may select a node in a conference region 32 as an active node, for example by clicking on or touching the image corresponding to the node. An "active node," as used herein, corresponds to a node that the host participant wants to focus on. After the node has been selected as an active node, the image of the selected node may be adjusted to a first image quality that is different from the image quality of the other nodes (i.e., the second image quality). In one embodiment, the first image quality is higher (e.g., at a relatively larger size, displayed at higher resolution, brightness, contrast, tone, sharpness, and/or lower noise level) than the second image quality. In some embodiments, the images displayed at a second (lower) image quality may be "masked" or "blurred" to reduce the perceived clarity. The adjustment of the above image quality parameters will be next described with reference to FIGS. 2, 3, and 4.

In the example of FIG. 2, participant 1 has not selected any of nodes 2-8 as an active node. As shown in FIG. 2, the image quality of nodes 2-8 are similar, in that the images are of low quality (low resolution, lower brightness, lower contrast, lower toned, higher noise level, less sharp, masked, and/or low frame rate). In this particular situation, the image quality of nodes 2-8 can be reduced since participant 1 is not focused on any of these nodes. Lowering the image quality often allows bandwidth and network resources to be conserved.

Figure 3:
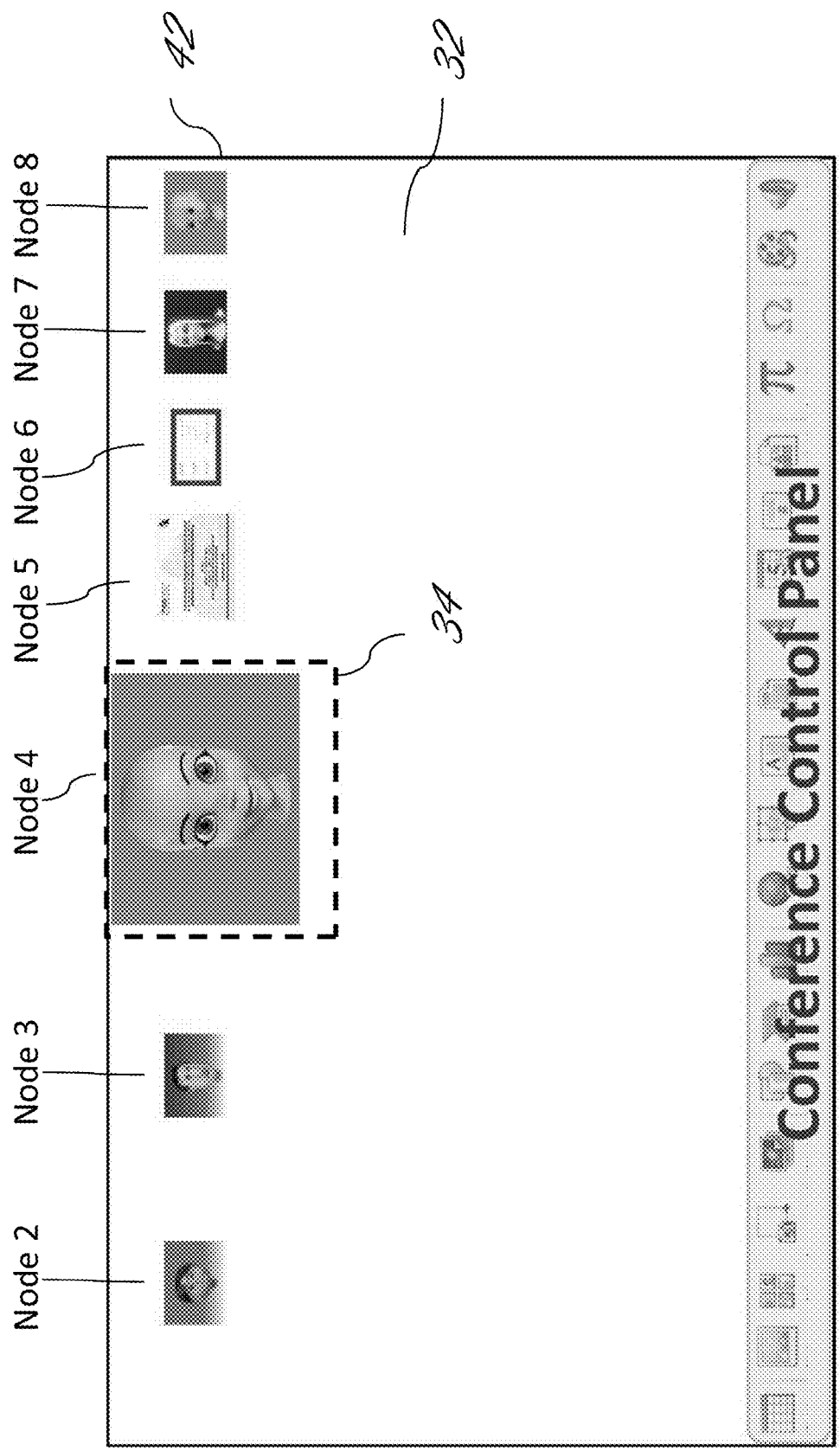
FIG. 3 depicts an exemplary view that is displayed at terminal 30-1 after participant 1 selects node 4 as an active node.

In some embodiments, the image quality and size of a node may adjust automatically after the node has been selected as an active node. "Automatically," as used herein, indicates that it is done without a specific user's command to make that change. FIG. 3 illustrates an example of an adjustment in the image quality and size of a node after the node has been selected as an active node. Referring back to the example of FIG. 2, suppose that participant 1 wants to focus on node 4. As shown in FIG. 2, the image of node 4 is located in a core region 34. The core region 34 is defined as a portion of the conference region 32 that lies within the vicinity of the core camera so that the core camera captures "watching-me" images of the participant when the participant focuses on the core region. The images of the non-active peer nodes lie outside the core region 34 (i.e., the core camera takes "watching-elsewhere" image of the participant when the participant focuses on the core region). Although the image of node 4 already lies within the core region, the image quality of node 4 is relatively low and of the same quality as the images of the non-active peer nodes. To allow participant 1 to differentiate the active node (node 4) from the non-active peer nodes and see it more clearly, the image quality and size of node 4 can be increased relative to the image quality and size of the non-active peer nodes. For example, after participant 1 has selected node 4 as the active node, screen 42 of FIG. 3 appears on the display device of terminal 30-1. As shown in FIG. 3, the image of the active node (node 4) is rendered at a higher quality and larger size than the images of the non-active peer nodes (nodes 2, 3, 5, 6, 7, and 8). The increased image quality and size of node 4 differentiates node 4 as the active node, and also allows participant 1 to see the image of node 4 more clearly.

Figure 4:
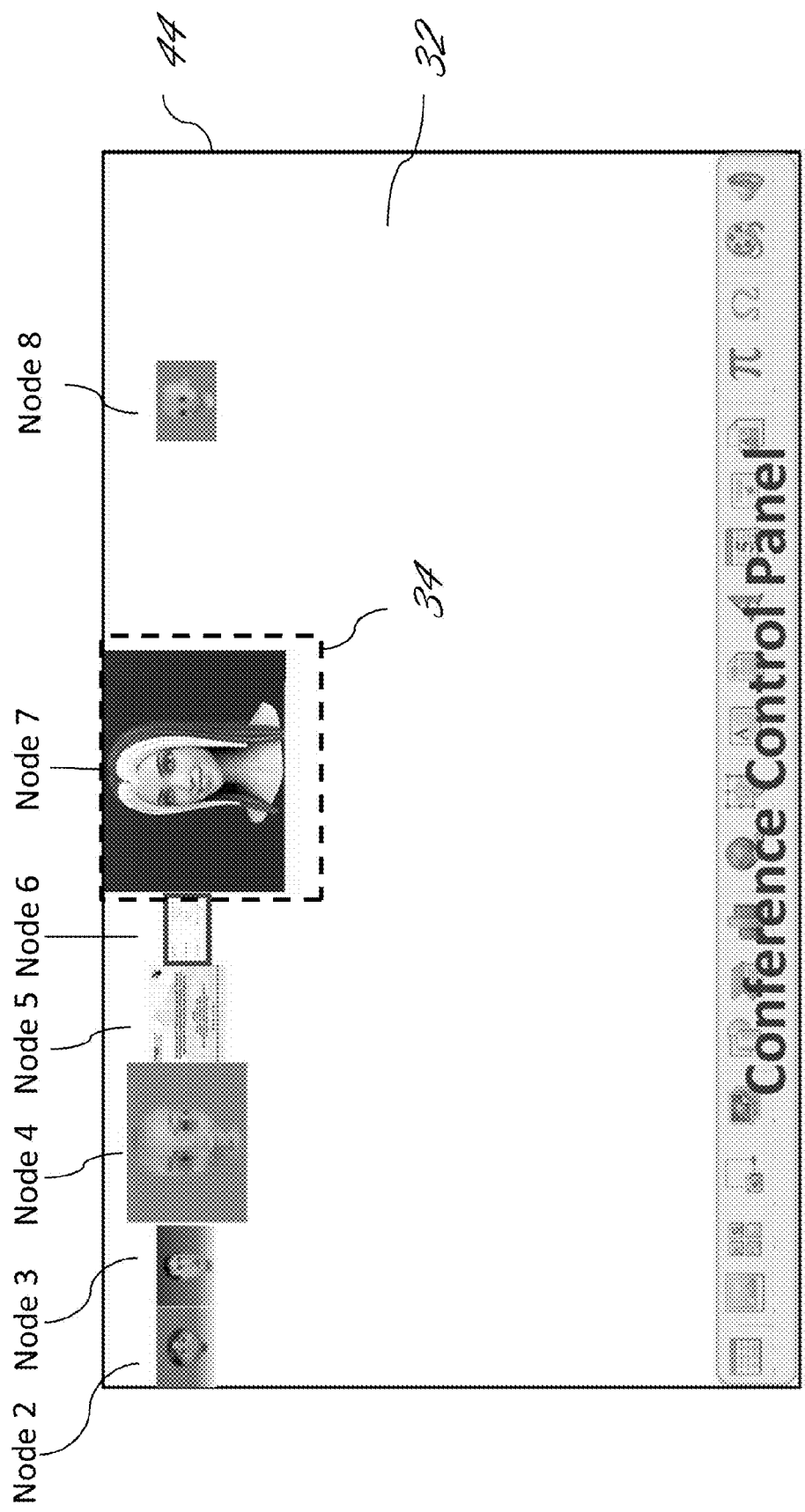
FIG. 4 depicts an exemplary view that is displayed at terminal 30-1 after participant 1 changes the active node to node 7.

In some embodiments, the position of a node may adjust accordingly after the node has been selected as an active node. FIG. 4 illustrates an example of an adjustment in the position of a node after the node has been selected as an active node. The positional adjustment depends on the position of the node prior to being selected as an active node relative to the core region. Referring back to the example of FIG. 3, suppose that participant 1 wants to focus on node 7, which is located outside the core region 34. The positions of the nodes may be adjusted such that the image of node 7 falls within the core region 34. For example, after participant 1 has selected node 7 as the active node, screen 44 of FIG. 4 appears on the display device of terminal 30-1. As shown in FIG. 4, the image of node 4 in the core region 34 (in FIG. 3) is now displaced by the image of node 7 (in FIG. 4) since participant 1 wants to focus on node 7, thereby allowing the core camera to take "watching-me" images and the non-core camera(s) to take "watching-elsewhere" images of participant 1 if participant 1 focuses on node 7. As further shown in FIG. 4, the image of the active node (node 7) is rendered at a higher quality and a larger size than the images of the non-active peer nodes (nodes 2, 3, 4, 5, 6, and 8). The increased image quality and size of node 7 differentiates node 7 as the active node, and also allows participant 1 to see the image of node 7 more clearly.

It should be readily appreciated that the above-described positional, size and quality adjustment of node images also applies if the example of FIG. 2 (or any possible screen configuration) were used as a starting point. In other words, if participant 1 in FIG. 2 selects node 7 as an active node, the image of node 7 will relocate to the core region 34 with an increase in image quality and size (relative to the non-active peer nodes), to produce screen 44 of FIG. 4.

In the example of FIG. 4, the positions of the non-active peer nodes (nodes 2, 3, 4, 5, 6, and 8) are readjusted such that the relative arrangement of the nodes (from left to right) remains the same after the switch in active node (from node 4 in FIG. 3 to node 7 in FIG. 4). This preserves the spatial relationship of the nodes relative to one another. Nevertheless, in some other embodiments, the spatial relationship between the nodes need not be preserved, and may change after a node has been selected as an active node.

Figure 5:
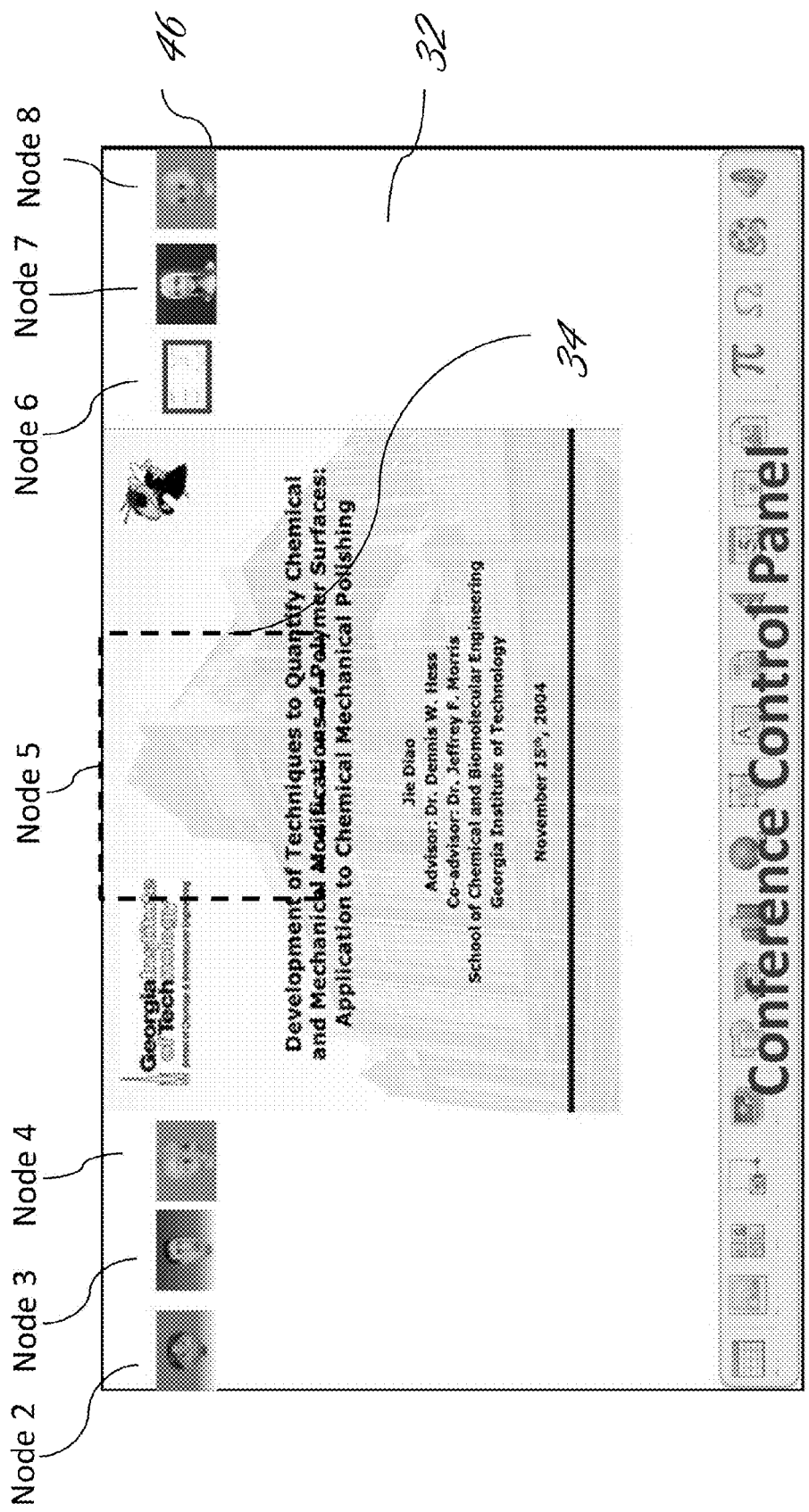
FIG. 5 depicts an exemplary view that is displayed at terminal 30-1 after participant 1 changes the active node to node 5.

Similar to the examples of FIGS. 3 and 4, FIG. 5 shows another example of adjustments to the image quality, size and position of a node that has been selected as an active node. Referring back to FIG. 4, suppose that participant 1 wants to focus on node 5, which is located outside core region 34. The image in node 5 may correspond to a PowerPoint™ presentation slide. The presentation may be projected on a projection screen, or it may be a data file shared by a participant with other participants. The positions of the nodes may be adjusted such that the image of node 5 is relocated to the core region 34. For example, after participant 1 has selected node 5 as the active node, screen 46 of FIG. 5 appears on the display device of terminal 30-1. As shown in FIG. 5, the image position of node 5 is relocated to the core region 34, thereby allowing non-core camera(s) to take "watching-elsewhere" images of the participant when the participant focuses on node 5. Since the images size of node 5 is larger than the core region 34, there is no guarantee that the core camera takes "watching-me' image. But this is not a concern because node 5 represents an inanimate object so that no "watching-me" image needs to be transmitted to node 5. As further shown in FIG. 5, the image of the active node (node 5) is rendered at a larger size and at a higher quality than the images of the non-active peer nodes (nodes 2, 3, 4, 6, 7, and 8). The increased image quality and size of node 5 differentiates node 5 as the active node, and also allows participant 1 to see the image of node 5 more clearly. Comparing FIG. 5 with FIGS. 3 and 4, it is observed that the image size of node 5 in FIG. 5 is larger than the image size of the active nodes in FIGS. 3 and 4. This is because the image of node 5 contains text and graphics, and therefore a larger image size allows participant 1 to see the text and graphics more clearly.

In some embodiments, the quality of the image of a node may adjust accordingly after the node has been selected as an active node. FIGS. 3-5 illustrate examples of an adjustment in the image quality of a node after the node has been selected as an active node. The image quality may be determined by resolution (i.e., the number of pixels) and/or (video) frame rate. To differentiate the image of the active node from the images of the non-active peer nodes, the image quality of the active node may be increased relative to the image quality of the non-active peer nodes. For example, the image quality in the active node in each of FIGS. 3, 4, and 5 may be increased as follows. With reference to FIG. 3, the image of the active node (node 4) is shown rendered at a higher quality than the images of the non-active peer nodes (nodes 2, 3, 5, 6, 7, and 8). With reference to FIG. 4, the image of the active node (node 7) is shown rendered at a higher quality than the images of the non-active peer nodes (nodes 5, 6, 8, 2, 3, and 4) With reference to FIG. 5, the image of the active node (node 5) is shown rendered at a higher quality than the images of the non-active peer nodes (nodes 2, 3, 4, 6, 7, and 8). In each of the above examples, the higher image quality at the active node differentiates the image of the active node from the images of the non-active peer nodes. The higher image quality at the active node allows participant 1 to see the image at the active node more clearly and helps to guide participant 1's gaze toward the core region where the active node is displayed.

By varying the image quality of each node, bandwidth and network resources can be conserved. For example, high quality video from the active node may be delivered to the host participant, while low quality videos (or low resolution still images) may be streamed from the non-active peer nodes. As a result, network bandwidth can be conserved and more efficiently utilized. In contrast, existing video conferencing systems consume significant bandwidth because they typically deliver high quality videos/images of all nodes (to all the nodes).

Furthermore, by varying the image quality displayed at each node, the host participant can focus his attention on the high quality video/image streaming from the active node (displayed in the core region), instead of the low quality videos/images streaming from the non-active peer nodes (outside the core region). As previously mentioned, the above method of displaying information is consistent with how people typically view and process visual information. Displaying high quality video/images only from the active node also helps to guide a participant's gaze toward the core region so that core camera can capture "watching-me" images of the participant and non-core camera(s) can capture "watching-elsewhere" images of the participant.

Next, the transcoding of video at each node to either high quality or low quality will be described. The videos from the non-active peer nodes may be transcoded to low resolution and/or low frame rate before transmission to the host participant. The transcoding to low resolution and/or low frame rate can reduce the bandwidth requirement for video transmission. In particular, the download bandwidth requirements can be significantly reduced at each terminal by lowering the resolution and/or frame rate of the videos from the non-active peer nodes. The savings in bandwidth will be apparent as the number of terminals in the virtual conference increases. In some extreme cases, the non-active peer nodes may be displayed as still images.

The transcoding of the video at each node may be carried out at either the server (e.g., central server 20) or at the terminals (e.g., terminals 30). Any suitable transcoding technique may be used.

In some embodiments, the central server 20 performs the transcoding. Each terminal 30 first transmits high quality video to the central server 20. The central server 20 monitors which node (if any) is the active node at each terminal 30. For example, the central server 20 receives an active node selection input from the host participant at each terminal, the active node selection input indicating which of the plurality of nodes the host participant selects as an active node for communication. For each terminal 30 that has an active node selected, the central server 20 transmits high quality video of the selected active node to the terminal 30. To conserve bandwidth, the central server 20 re-codes the high quality videos from the non-active peer nodes into low quality videos, before transmitting the low quality videos of the non-active peer nodes to the terminal 30.

In some other embodiment, the terminals 30 perform the transcoding. The central server 20 updates all terminals 30 in real-time with information regarding which node is the active node at each terminal 30. A terminal 30 may transmit high quality video to the central server 20 if the terminal 30 has been selected by at least one other terminal 30 as an active node. For example, if terminals 30-2 and 30-5 have selected terminal 30-1 as their active node, terminal 30-1 may transmit high quality video to the central server 20 which then transmits the high quality video (from terminal 30-1) to terminals 30-2 and 30-5. Conversely, if terminal 30-1 has not been selected as an active node by any other terminal 30, terminal 30-1 may transmit only low quality video to the central server 20.

Dynamic Adjustment of Screen Display to Reflect Gaze Information

As previously mentioned, existing video conferencing systems lack eye contact and gaze information about the participants. The absence of eye gaze information can lead to miscommunication among the participants. For example, in a video conference with multiple people, it is sometimes difficult to tell exactly whom a participant is speaking to. As a result, gaze confusion may arise.

The embodiments of the invention can eliminate gaze confusion by dynamically adjusting a display screen (e.g., screen 42 of FIG. 3) to reflect the gaze recipient of the participant in the active node, so as to convey accurate gaze information. The gaze recipient is a participant (associated with another node) that the participant in the active node is focusing on.

A participant can obtain accurate gaze information of a peer participant by selecting the node of the peer participant as its active node. At each terminal 30 of the system 10, the central server 20 periodically monitors input from each terminal 30 and determines whether an active node has been selected, and which node the participant in the active node is focusing on. For example, with reference to FIG. 3, participant 1 can select node 4 as the active node to obtain accurate gaze information of participant 4.

Gaze information can be generally classified into two categories: (1) the peer participant focusing on the host participant and (2) the peer participant focusing on a node other than the host participant. Gaze information in the first category can be delivered in a more natural way by guiding the gaze of the peer participant so that "watching-me" images of the peer participant can be captured and transmitted to the host participant. Gaze information in the second category can be delivered in a more natural way by first guiding the gaze of the peer participant so that "watching-elsewhere" images of the peer participant can be captured and transmitted to the host participant and then displaying the "watching-elsewhere" image together with the image from the object node (the peer participant's active node) in a certain way so that the host participant is induced to think that the peer participant is focusing on the object node. Examples of the two categories will be described below.

In some instances, two participants may be focusing on each other. In the example of FIG. 3, participant 1 has selected node 4 as an active node. Participant 4 may in turn select node 1 as an active node. In other words, participants 1 and 4 are focusing on each other. Participant 1 is node 4's gaze recipient, and participant 4 is node 1's gaze recipient. As shown in FIG. 3, the screen 42 includes a front facial image of participant 4 (the "watching-me" image of participant 4 as captured by the core camera of terminal 4), such that participant 4's eye contact appears to be guided towards participant 1 when viewing from terminal 30-1. Likewise, a screen on terminal 30-4 (not shown) will include a front facial image of participant 1 (the "watching-me" image of participant 1 as captured by the core camera of terminal 1), such that participant 1's eye contact appears to be guided towards participant 4 when viewing from terminal 30-4. As a result, participants 1 and 4 will be under the impression that they are focusing on each other, which aligns with the intentions of both participants.

Figure 6:
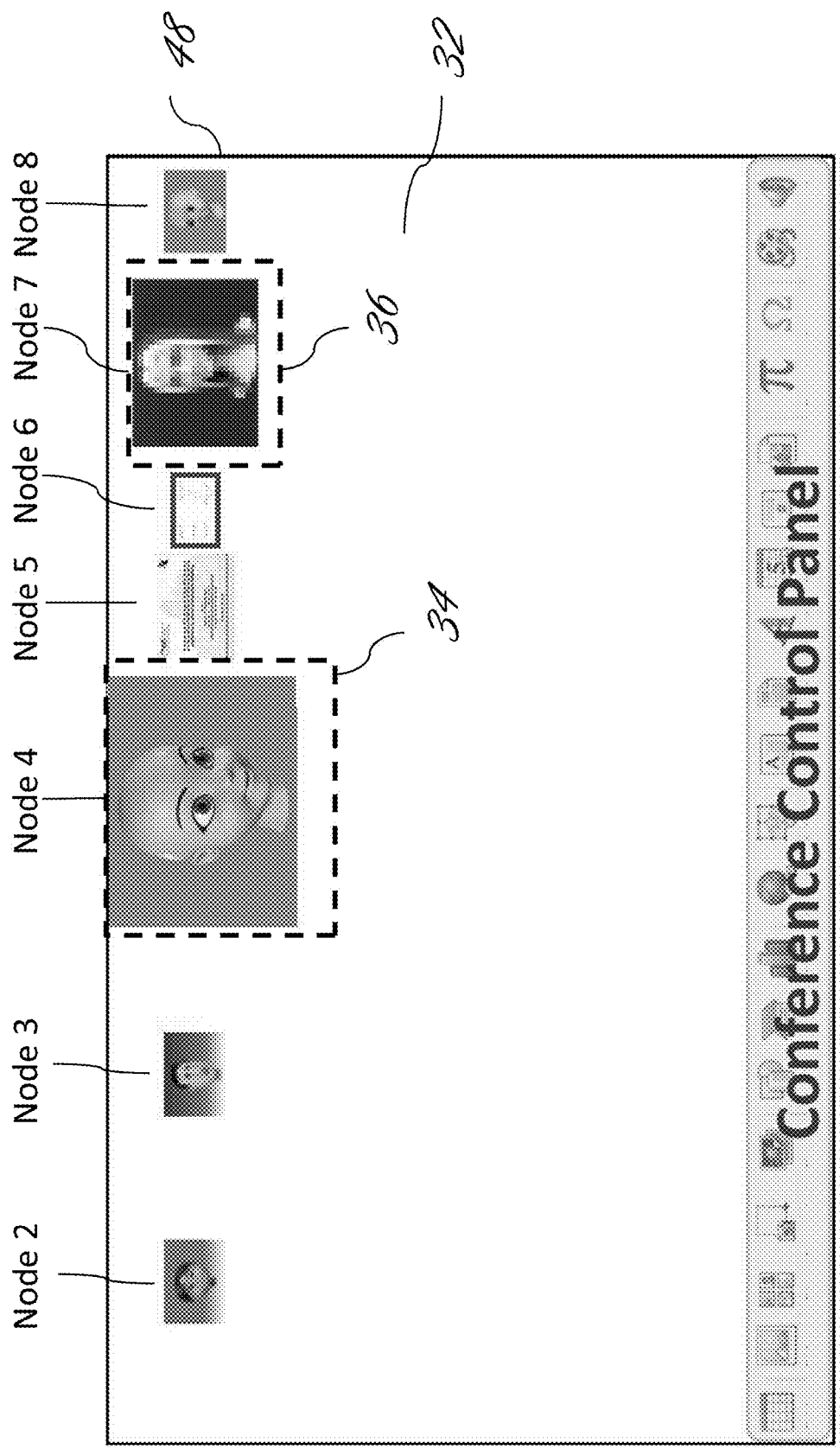
FIG. 6 depicts an exemplary view that is displayed at terminal 30-1 when participant 1 is focusing on participant 4, and participant 4 is focusing on participant 7.

In other instances, a first participant may be focusing on a second participant who may in turn be focusing on a third participant. The third participant may be focusing on the first participant, second participant, or another participant. Alternatively, the third participant may not be focusing on any node. Subsequently, this can result in a conference environment with several levels of interaction among the participants. The above scenario is depicted in the example of FIG. 6. Referring to FIG. 6, participant 1 has selected node 4 as an active node, and is focusing on participant 4. However, participant 4 has selected node 7 as an active node, and is focusing on participant 7. In other words, participant 1 is focusing on participant 4, and participant 4 is focusing on participant 7. Here, participant 7 is node 4's gaze recipient, and participant 4 is node 1's gaze recipient. Therefore, participant 1 is focusing on participant 4 and participant 4 is focusing on participant 7.

From the viewpoint of participant 1 in FIG. 6, node 4 is the active node and node 7 is an object node. The "object node," as used herein, refers to the active node of a host participant's active node. Specifically, the object node is a node that the participant in the active node is focusing on. In the example of FIG. 6, node 7 is the object node from participant 1's perspective because participant 4 (participant 1's active node) is focusing on participant 7. In the case where participant 1 selects participant 4 as the active node and participant 4 selects participant 1 as his active node (such that the host participant is also his object node), eye contact is established between participants 1 and 4 (as shown in FIG. 3).

As previously described with reference to FIG. 6, participant 1 is focusing on participant 4, and participant 4 is focusing on participant 7. To reflect the gaze information pertaining to participants 1 and 4, the relative size and orientation of the participants' images can be dynamically adjusted using one or more of the following methods.

To adjust the relative size of the participants' images, the image of the object node can be rendered more prominent relative to the images of the non-active peer nodes. This can be done, for example, by displaying the image of the object node at a larger size or by changing the brightness of the image of the object node. For example, as shown in FIG. 6, the image of the object node (node 7) is rendered at a larger size than the images of the non-active peer nodes (nodes 2, 3, 5, 6, and 8), but remains at a smaller size than the image of the active node (node 4). In some embodiments, the active node is rendered at a first image quality, the non-active peer nodes are rendered at a second image quality, and the object node is rendered at a third image quality. The first, second, and third images qualities can differ in at least one of the factors that affect the clarity of the image as perceived by a viewer, including but not limited to resolution, brightness, contrast, sharpness, tone, noise level, and frame rate of an image.

To adjust the orientation of the participants' images, a "watching-elsewhere" image from a non-core camera that shows a side facial image of the participant is transmitted for display, such that the image at the active node appears to face in the direction of the image of the object node. For example, as shown in FIG. 6, the relative orientation of node 4 as reflected in the "watching-elsewhere" image of participant 4 creates the impression that participants 4 is focusing on participant 7, as seen by participant 1 at terminal 30-1. Specifically, participant 4 appears to face in the direction of participant 7 (the object node).

In the example of FIG. 6, when viewing from terminal 30-4, participant 4 will see participant 7 in the core region, such that a "watching-elsewhere" image of participant 4 can be captured by one of the non-core cameras and be transmitted to terminal 30-1. When viewing from terminal 30-1, participant 1 will see the image of participant 4 facing participant 7 (as shown in FIG. 6). Thus, accurate gaze information regarding each participant in the virtual conference can be conveyed to all the participants. It should be noted that participant 1 can only obtain accurate gaze information of the participant of the active node (participant 4). If participant 1 wants to find out the gaze information of another peer participant (for example, participant 7), participant 1 will need to focus on participant 7 first.

Another way to convey accurate gaze information is to designate specific regions for the object node on a screen at a terminal 30. For example, whenever an image of a node appears in the specific regions, a participant will be able to identify it as an object node. The specific regions may be located on the left and/or right portions of the conference region 32, and may have a predetermined spatial relationship relative to the core region 34 and/or the edges of the screen. For example, as shown in FIG. 6, a specific region 36 may be designated to be approximately ¼ of the screen length from the right edge of screen 48. When the image of node 7 (with adjusted image size and orientation) appears in the specific region 36, participant 1 may then infer node 7 to be the object node.

The relative orientation of the images of the nodes can be dynamically adjusted using one or more cameras. For example, a core camera and a non-core camera may be used. The core camera may be a camera that is capable of capturing "watching-me" images, and the non-core camera may correspond to a camera that is capable of capturing "watching-elsewhere" images. The core and non-core cameras may include physical imaging devices.

In some embodiments, a camera may extend beyond a physical imaging device. For example, a camera may include any mechanism or technique that is capable of generating images. In some embodiments, a core camera and a non-core camera may refer to two distinct algorithms that are capable of processing images obtained from a single physical device. The images processed and subsequently generated by the core camera may include actual "watching-me" images, or images that are intended to create a "watching-me" impression to a viewer. The images generated by the non-core camera may include actual "watching-elsewhere" images, or images that are intended to create a "watching-elsewhere" impression to a viewer. Embodiments of the core and non-core cameras will be further described as follows.

Figure 7:
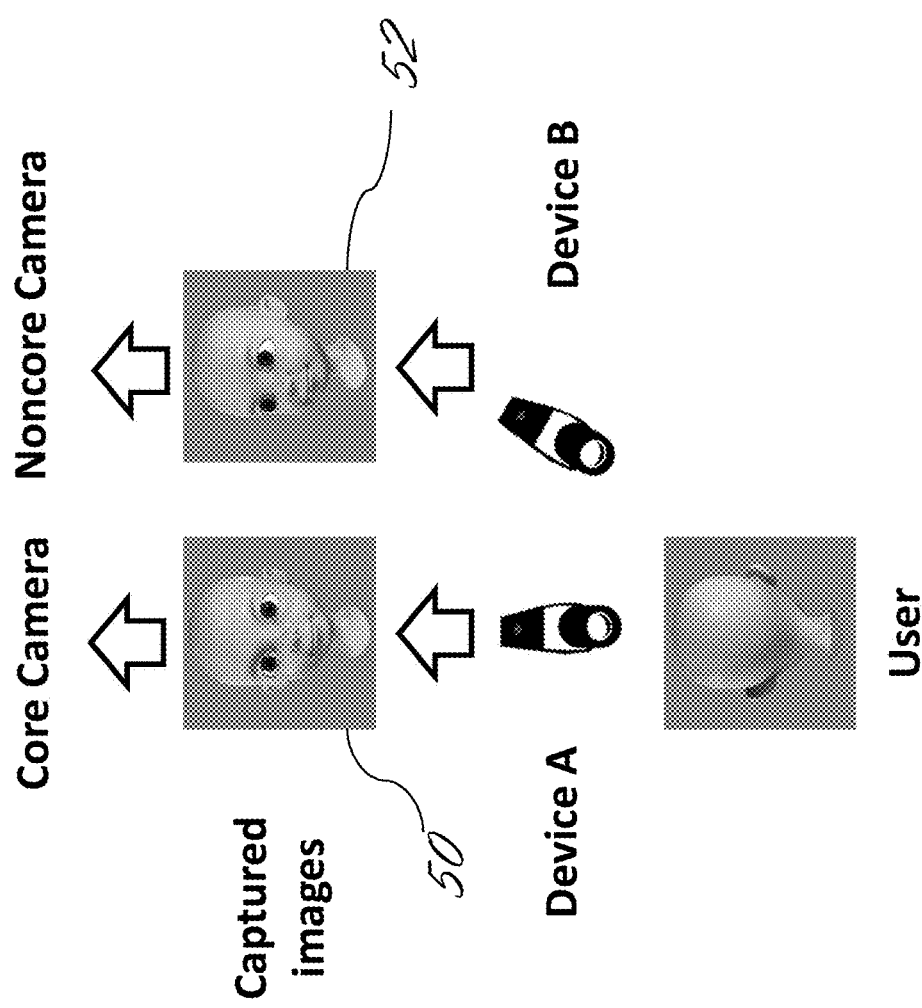
FIG. 7 depicts an example of a camera layout at a terminal according to a first embodiment.

In a first embodiment shown in FIG. 7, the core camera may include a physical imaging device (Device A) that captures one or more images of a user from a certain angle, and the non-core camera may include another physical imaging device (Device B) that captures one or more images of the user from another different angle. As shown in FIG. 7, the core camera (Device A) may capture a front facial image 50 of the user, while the non-core camera (Device B) may capture a side facial image 52 of the user.

Figure 8:
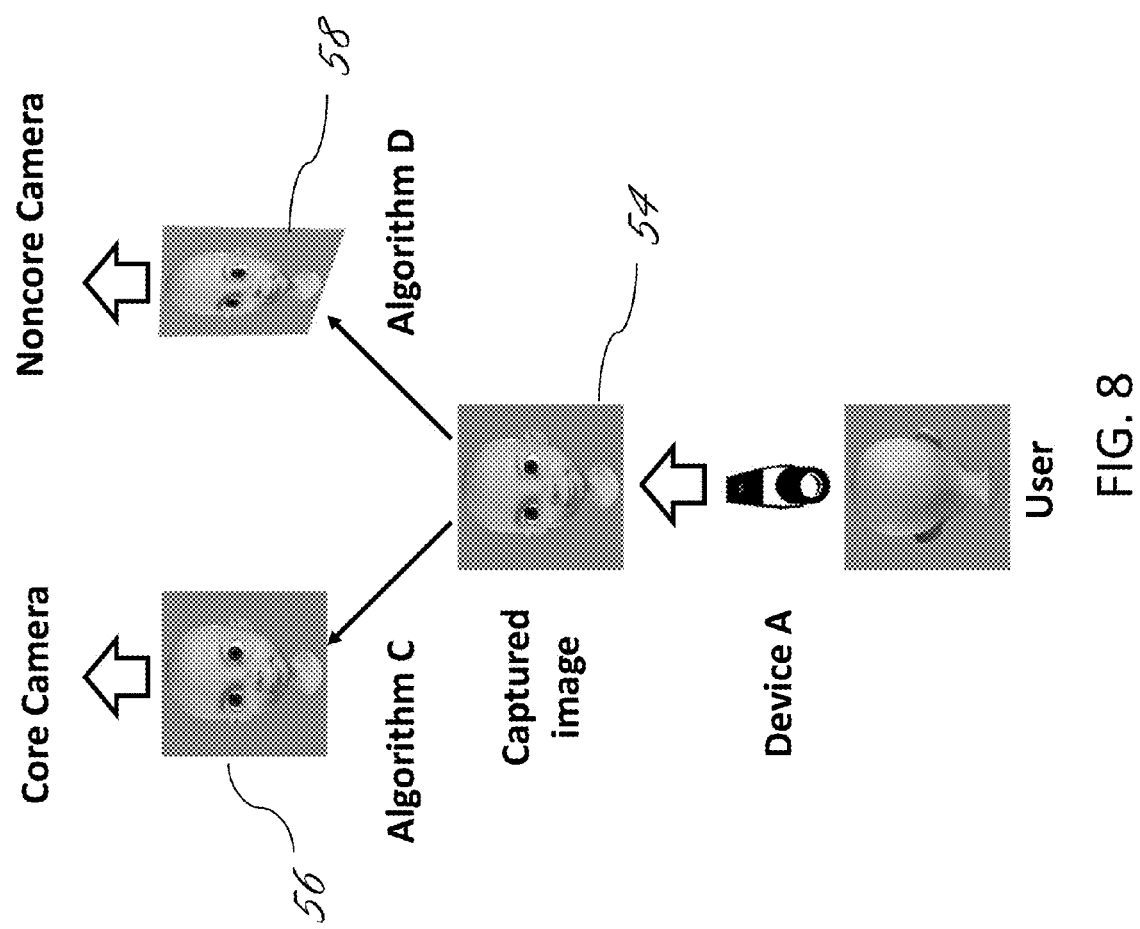
FIG. 8 depicts an example of a camera layout at a terminal according to a second embodiment.

In a second embodiment shown in FIG. 8, one or more images of a user are first captured by a physical imaging device (Device A). The core camera may be a technique (based on Algorithm C) that manipulates the images in a certain way. The non-core camera may be another technique (based on Algorithm D) that manipulates the images in another way. As shown in FIG. 8, Device A may capture a front facial image 54 of the user which may then be manipulated by Algorithm C and/or Algorithm D. For example, the core camera (using Algorithm C) may produce an image 56 corresponding to the front facial image 54, without manipulating the front facial image 54. The non-core camera (using Algorithm D) may produce a side facial image 58 by turning or rotating the front facial image 54 with respect to a vertical axis passing through the center of the front facial image 54. As shown in FIG. 8, the user's head in the side facial image 58 appears to be turned slightly towards the user's right.

Figure 9:
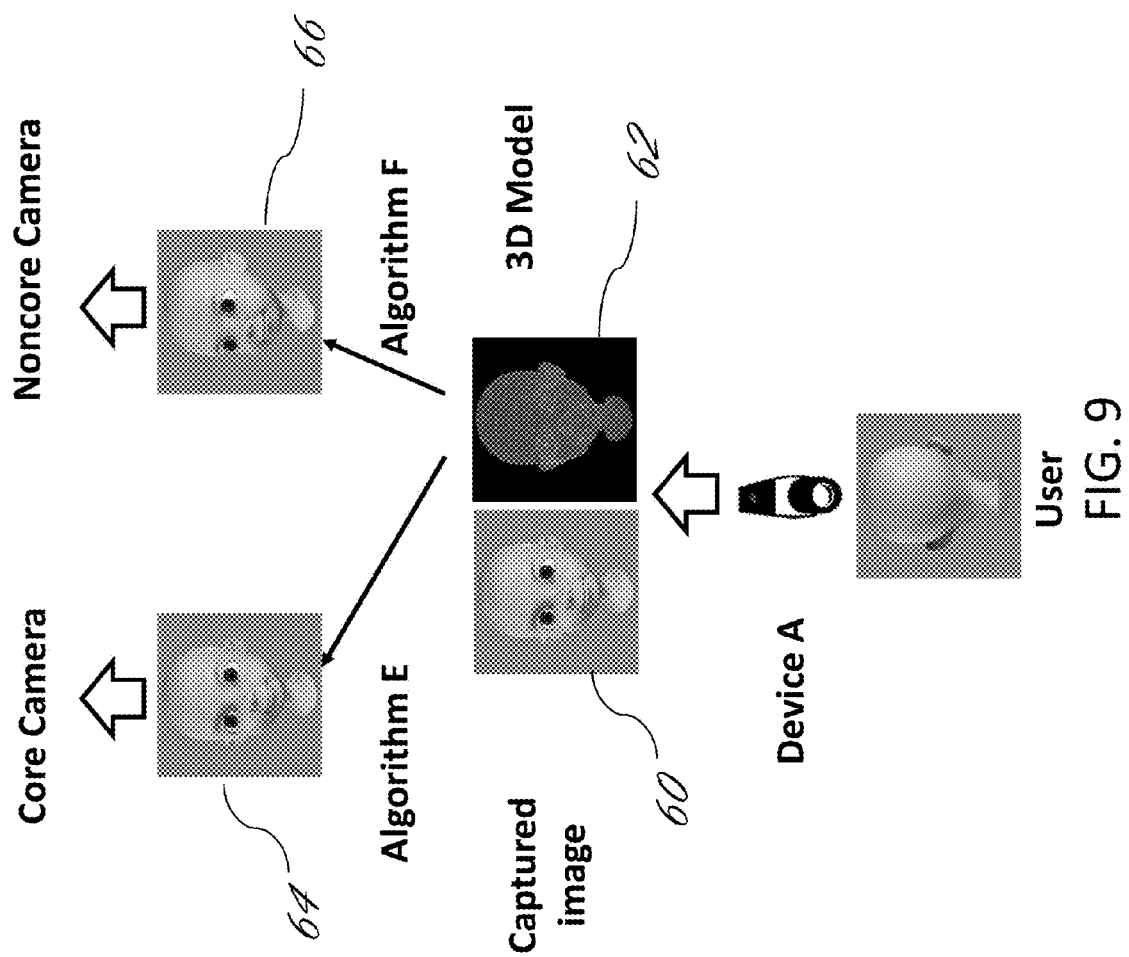
FIG. 9 depicts an example of a camera layout at a terminal according to a third embodiment.

In a third embodiment shown in FIG. 9, a 3-D model is first built based on one or more images of a user captured by a physical imaging device (Device A). The core camera may be a technique (based on Algorithm E) that uses the 3-D model to generate images as viewed from a particular angle. The non-core camera may be another technique (based on Algorithm F) that uses the same 3-D model to generate images as viewed from another different angle. As shown in FIG. 9, Device A may capture a front facial image 60 of the user. A 3-D model 62 is then built based on the front facial image 60. Next, the core camera (using Algorithm E) generates a front facial image 64 of the user based on the 3-D model 62, while the non-core camera (using Algorithm F) generates a side facial image 66 of the user based on the 3-D model 62.

In each of the above-described embodiments, the user may include, for example, a participant in a virtual conference. The devices A and B may be located on or at each terminal (e.g., terminal 30). The images (50, 52, 54, 56, 58, 60, 64, and 66) and 3-D model 62 may be stored on the terminals and further transmitted to a server (e.g., central server 20). The server may transmit the images to each terminal accordingly depending on the orientation and interaction between the participants. The Algorithms C, D, E, and F in FIGS. 8 and 9 may be included in computer programs or software stored on the terminals and/or the server.

Creating Visual Cues to Convey Gaze Information

In some embodiments (e.g., the embodiments of FIGS. 14 and 15), visual cues are implemented as a main way of delivering gaze information. Even in other embodiments that do not rely on visual cues as the main way to deliver gaze information (e.g., in the embodiments of FIGS. 2-6, 10-13, and 16-25), however, visual cues may be adopted to supplement other ways of conveying gaze information.

In addition to dynamic adjusting of the display to show the gaze information of the participant displayed in the active node, other methods can be used to convey gaze information. For example, a host participant may want to know who has the attention of the active node participant, or seek "who-is-focusing-on-me" and "who-is-focusing-on-what-I-am-focusing-on" information. The above information can be conveyed by creating visual effects to differentiate those participants who are focusing on the host participant, and those participants who are focusing on the same thing as the host participant.

Coloring is a type of visual effect that can be used to differentiate the participants. For example, all the nodes that have selected the host participant as their active node may be shown with a border of a specific color (e.g., pink). The background of a conference region (e.g., conference region 32) can assume the same color (e.g., pink), with the color intensity varying with the number of peer participants choosing the host participant as their active node. For example, if no one chooses the host participant as the active node, the background of the conference region 32 of the host participant's terminal may be white. When a peer participant chooses the host participant as the active node, the background of the conference region of the host participant's terminal may then assume a light pinkish color. The background color of the conference region may turn into a darker shade of pink if more peer participants choose the host participant as their active node.

Similarly, the nodes that have selected the same active node as the host participant may be shown with a border of another specific color (e.g., green).

Figure 10:
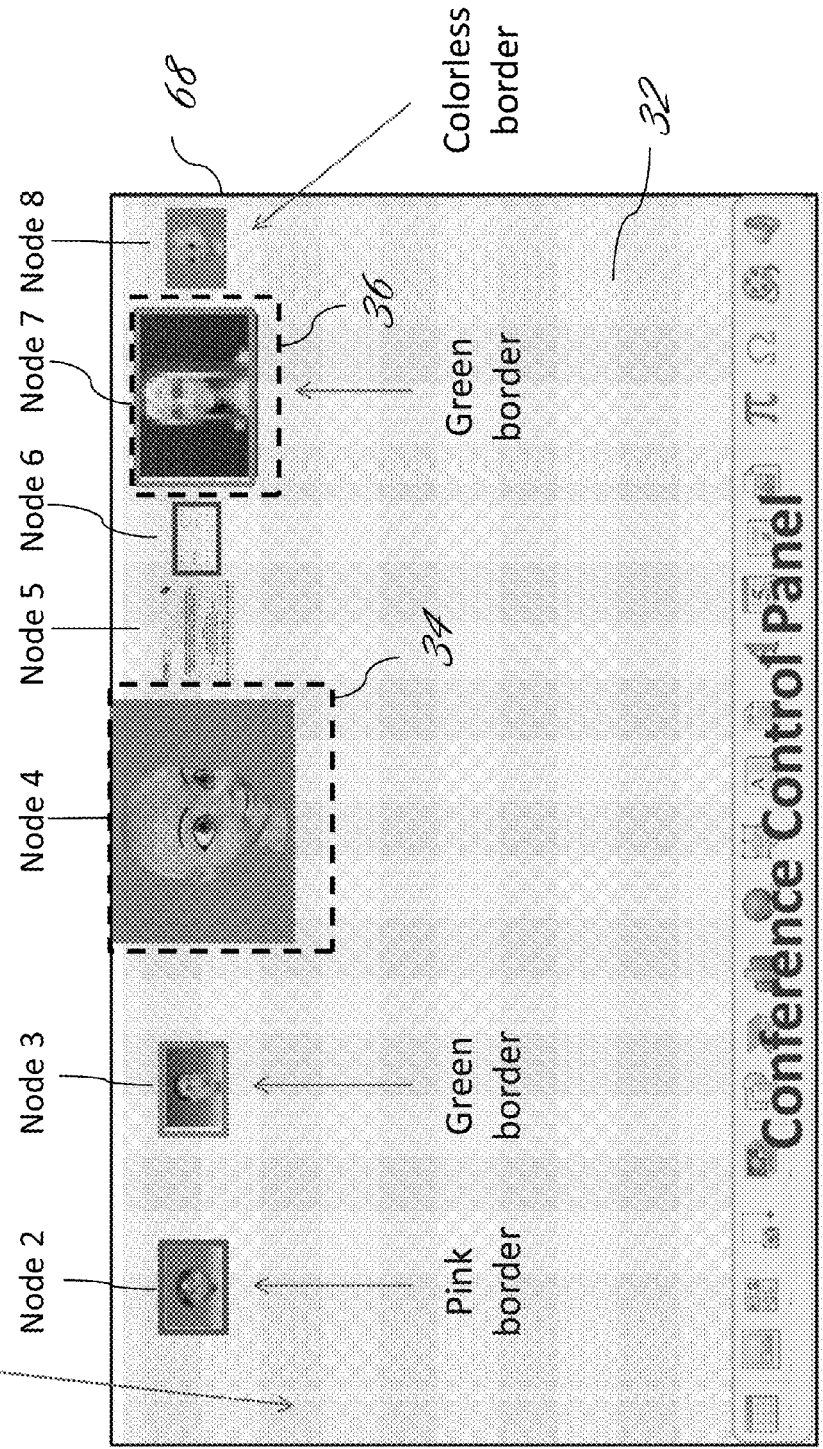
FIG. 10 illustrates the use of a coloring scheme to differentiate active nodes and non-active peer nodes according to some embodiments.

The above visual cues (coloring scheme) will be described with reference to FIG. 10. Specifically, FIG. 10 shows how coloring can be used to convey gaze information. FIG. 10 depicts an example of what may be shown on the video input and output device at terminal 30-1 of FIG. 1, as viewed by participant 1 during a conference. In the example of FIG. 10, participant 1 has selected node 4 as the active node.

Referring to FIG. 10, participant 2 is focusing on node 1 (participant 1). This results in a pink border surrounding the image of node 2 on screen 68 at terminal 30-1. The background of conference region 32 also turns to light pink to inform participant 1 that "someone is watching" (in this case, participant 2 is focusing on participant 1). At the same time, participants 3 and 7 may have selected the same active node (node 4) as participant 1. This results in green borders surrounding the images of nodes 3 and 7 on the screen 68. Although participant 8 appears to be focusing to his right, participant 8 is in fact not focusing on node 4. As a result, no visual effect (e.g., green border) is rendered on the image of node 8.

In addition to colored borders, other visual cues may serve similar purposes. For example, different colors or patterns can be applied to any display object related to a particular node, so as to allow a participant to infer gaze information. The display object includes, for example, background pattern, shadow, border, label, flag, title, etc. In some embodiments, a thumbnail image or video associated with a particular node's active node can be displayed within or close to the video of that particular node.

Creating Sound Effects to Convey Gaze Information

In some embodiments, sound can be used to convey gaze information. The system (e.g., system 10) may continuously monitor who is focusing on whom at each terminal (e.g., terminal 30). Whenever a participant at a terminal selects an active node (or a new active node), the system detects the input selection from the participant, and may produce certain sounds at specific terminals to alert the participants about the new selection. For example, if a peer participant wants to focus on participant A and selects participant A as the active node, a ring tone may be briefly played at terminal A to alert participant A that "someone just switched her attention to you."

Node Conglomerates

In some embodiments, a node conglomerate can be created to represent a group of nodes. Specifically, certain nodes are assigned to a group, and the group of nodes is represented by a node conglomerate. This grouping (or representation) is useful when there are a large number of participants in the conference, or when display of images of all the nodes on a screen is limited by the size of the display (e.g., on a mobile phone display).

In some embodiments, a node conglomerate is displayed like a regular node if none of the nodes in the node conglomerate has been selected as an active node or object node. Examples of node conglomerates will be described with reference to FIGS. 11, 12, and 13.

Figure 11:
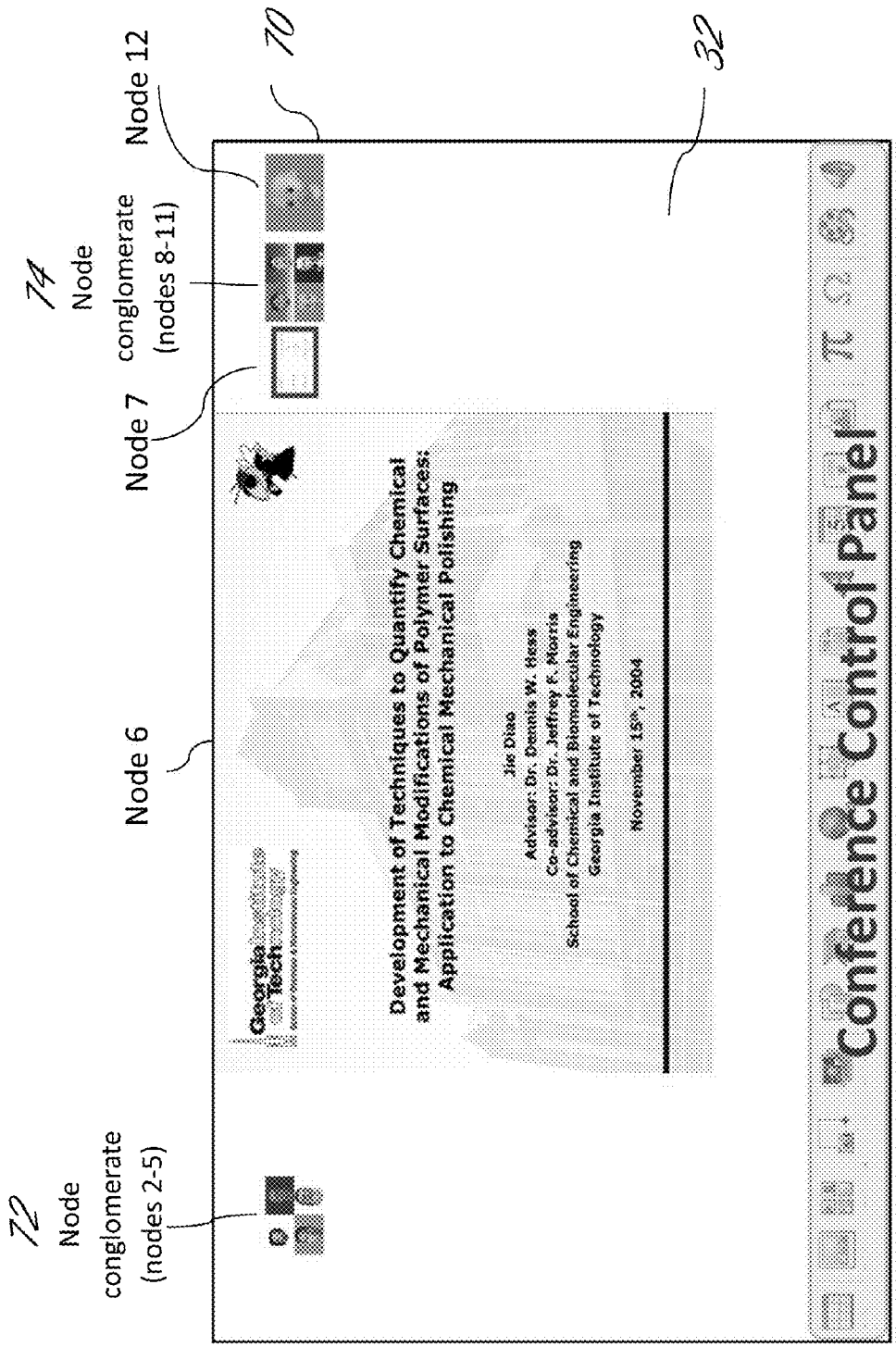
FIG. 11 illustrates the use of node conglomerates to cluster groups of nodes according to some embodiments.

FIG. 11 depicts an example of what may be shown on the video input and output device at terminal 30-1 of FIG. 1, as viewed by participant 1 during a conference. As shown in FIG. 11, the participants in the conference include a first node conglomerate 72 (consisting of nodes 2, 3, 4, and 5) and a second node conglomerate 74 (consisting of nodes 8, 9, 10, and 11). Since participant 1 has already selected node 6 as the active node, the first node conglomerate 72 and the second node conglomerate 74 will not have any node that is the active node (of participant 1). Also, none of the eight nodes (2-5 and 8-11) in the first and second node conglomerates 72/74 is the object node at terminal 30-1. As a result, the images of the first node conglomerate 72 and the second node conglomerate 74 are displayed similar to those of non-active peer nodes. As shown in FIG. 11, the image quality of each node conglomerate 72/74 is similar to those of the non-active peer nodes (nodes 7 and 12).

In some embodiments, a node conglomerate behaves like a non-active peer node until a node from the node conglomerate is singled out. A node from the node conglomerate is singled out when the node is selected as an active node or object node. To select a node in a node conglomerate as an active node, a participant first selects the node conglomerate as a temporary active node. The function of the temporary active node is to assist a host participant to quickly browse through the nodes in the node conglomerate before making a decision whether to select an active node from those nodes. When a node conglomerate has been selected as a temporary active node, the nodes in the node conglomerate may display in the core region for a predetermined period of time.

Figure 12:
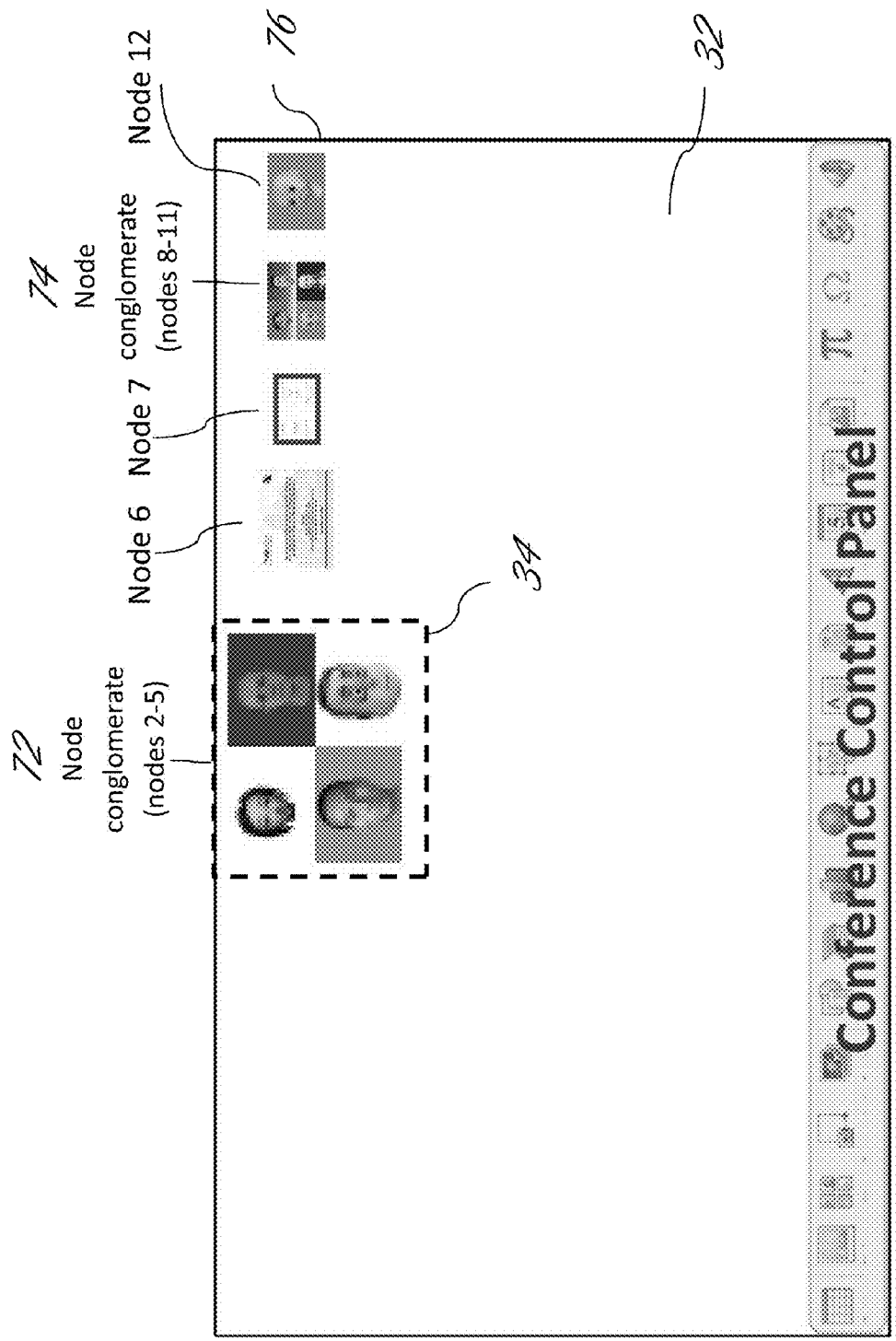
FIG. 12 depicts an exemplary view that is displayed at terminal 30-1 after participant 1 selects a first node conglomerate 72 as a temporary active node.

FIG. 12 illustrates an example of what happens when a node conglomerate has been selected as a temporary active node. Referring back to the example of FIG. 11, suppose that participant 1 selects the first node conglomerate 72 as a temporary active node. However, the first node conglomerate 72 is located outside core region 34. The positions of the nodes may be adjusted such that the image of the first node conglomerate 72 falls within the core region 34. For example, after participant 1 has selected the first node conglomerate 72 as the temporary active node, screen 76 in FIG. 12 appears on the display device of terminal 30-1. As shown in FIG. 12, the image of the first node conglomerate 72 is relocated to the core region 34. The image of node 6 in the core region 34 (in FIG. 11) is now displaced by the image of the first node conglomerate 72 (in FIG. 12). As further shown in FIG. 12, the image of the first node conglomerate 72 is rendered at a larger size than the images of the non-active peer nodes (nodes 6, 7, 12, and second node conglomerate 74). The increased image size differentiates the first node conglomerate 72 as the temporary active node, and also allows participant 1 to see the individual node images in the first node conglomerate 72 more clearly. In some embodiments, the individual node images at the temporary active node may continue to be rendered at low quality so as to conserve bandwidth.

Figure 13:
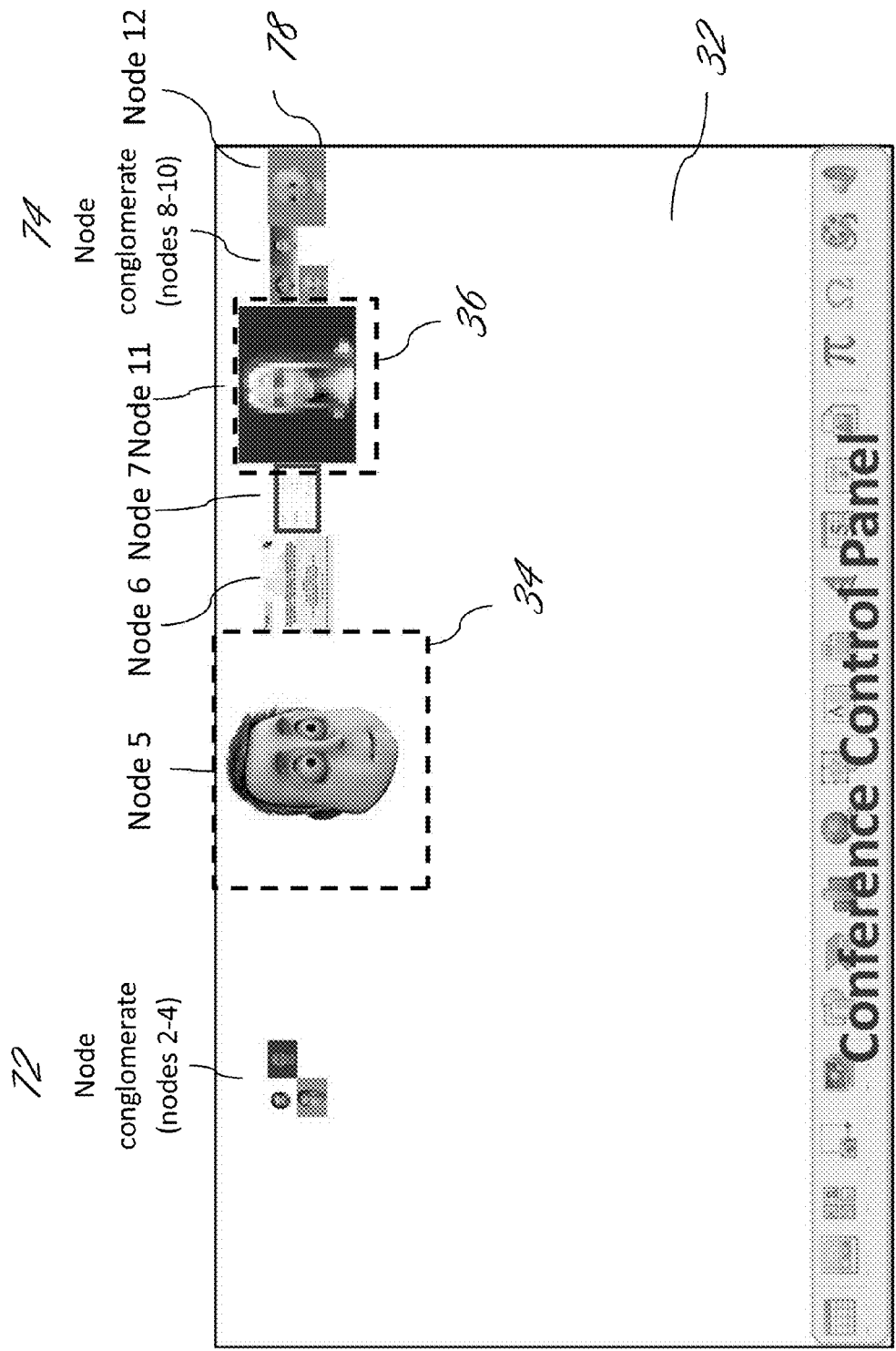
FIG. 13 depicts an exemplary view that is displayed at terminal 30-1 after participant 1 selects node 5 from the first node conglomerate 72 as an active node.

FIG. 13 illustrates an example of what happens when a node from the node conglomerate has been selected as an active node, while the node conglomerate is in temporary active node status. Referring back to the example of FIG. 12, suppose that participant 1 selects a node from the first node conglomerate 72 as an active node. The selected node will be singled out and displayed in the core region 34 at a first (e.g., high) image quality, while the first node conglomerate 72 (excluding the selected node) reverts to its original image size (similar to that of a non-active peer node). For example, after participant 1 has selected node 5 as the active node, screen 78 in FIG. 13 appears on the display device of terminal 30-1. As shown in FIG. 13, the image of node 5 (the active node) is displayed in the core region 34 at a first image quality (e.g., higher resolution and higher frame rate) while the non-active peer nodes and the first node conglomerate 72 (excluding node 5) are displayed in a second image quality (lower resolution and lower frame rate) as shown in FIG. 11.

In some embodiments, if a selected node loses its active node status, the node will be added back to the node conglomerate where it originally belonged. For example, if participant 1 in FIG. 13 selects another node as the active node, node 5 will lose its active node status. Subsequently, node 5 will be added back to the first node conglomerate 72 where node 5 originally belonged. If the new active node is not selected from the first node conglomerate 72, the first node conglomerate 72 restores to its original appearance as shown in FIG. 11. If the new active node is selected from the first node conglomerate 72, the image of node 5 (in the core region 34) will be replaced with the image of the new active node accordingly.

FIG. 13 also illustrates an object node selected from a node conglomerate. As previously mentioned, a node from a node conglomerate is also singled out when the node is selected as an object node. If one of the nodes in a node conglomerate is selected as the object node, the object node will be singled out and displayed similar to that of a regular object node (e.g., node 7 of FIG. 6), while the node conglomerate (excluding the object node) reverts to its original image size and quality (similar to that of a non-active peer node). FIG. 13 shows an object node (node 11), in addition to the active node (node 5). In other words, node 11 is the active node of node 5, and participant 5 is focusing on participant 11. In the example of FIG. 13, node 11 is singled out from the second node conglomerate 74 and displayed such that participant 1 may infer participant 5 (the active node) is focusing on participant 11 (the object node). This is because the image size of node 11 is rendered larger than the image size of the other non-active peer nodes, and participant 5's eye contact appears to be guided towards participant 11. Also, the image of node 11 is located in an object node region 36, and therefore participant 1 will recognize node 11 is an object node. The image of the second node conglomerate 74 (excluding node 11) continues to be displayed similar to the images of the non-active peer nodes (nodes 6, 7, 12, and first node conglomerate 72).

In some embodiments, if a singled-out node loses its status as the object node, the node will be added back to the node conglomerate where it originally belonged. For example, if participant 5 in FIG. 13 selects another node as the active node, node 11 will lose its object node status. Subsequently, node 11 will be added back to the second node conglomerate 74 where node 11 originally belonged. If the new object node is not selected from the second node conglomerate 74, the second node conglomerate 74 will restore to its appearance as shown in FIG. 11. If the new object node is selected from the second node conglomerate 74, the image of node 11 (in the object node region 36) will be replaced with the image of the new object node accordingly.

As previously mentioned, when a node conglomerate has been selected as a temporary active node, the nodes in the node conglomerate may be displayed in the core region for a predetermined period of time (e.g., two seconds). However, if a host participant does not select any node as the active node within the predetermined period of time (or if there is no object node from the node conglomerate), the screen will revert to the condition prior to the node conglomerate being selected as the temporary active node. Effectively, the node conglomerate loses its status as a temporary active node at the end of the predetermined period, and reverts to its original image size and quality (similar to that of a non-active peer node). During the predetermined time period, if the host participant has not selected a node as an active node, the server (e.g. central server 20) will not automatically assign all the nodes in the node conglomerate as the active node. This is to minimize the confusion that can arise by assigning multiple gaze recipients to a single terminal. In the example of FIG. 12, if participant 1 has not selected any node from the first node conglomerate 72 as an active node within a predetermined period of time, or if there is no object node from either the first node conglomerate 72 and/or the second node conglomerate 74 during the predetermined period of time, the screen 76 in FIG. 12 will then revert to the screen 70 shown in FIG. 11.

Conveying Gaze Information with Static Screen Display

The invention is not limited to dynamic adjustments of a screen display to present gaze information to the participants in a conference. In some embodiments, the information can be presented in a static display after the video conferencing system receives "who-demands-to-focus-on-what" information from all terminals. As previously described, in some embodiments, a host participant can see his own image displayed in a conference region (e.g., conference region 32) on a screen at his terminal (e.g., terminal 30). This allows the host participant to see his own image, as viewed by other participants on their terminals during the conference.

In some embodiments, a thumbnail image or video associated with node X's active node (e.g., node Y) can be displayed within or close to the video of node X. In this way, the system (e.g., system 10) allows participants to know who is focusing on what or whom, without changing the relative positions of nodes on the screen. FIGS. 14A, 14B, 15A, and 15B illustrate gaze information conveyed using a static screen display based on a delivered-on-demand model in accordance with the above embodiments.

Figures 14A, 14B:
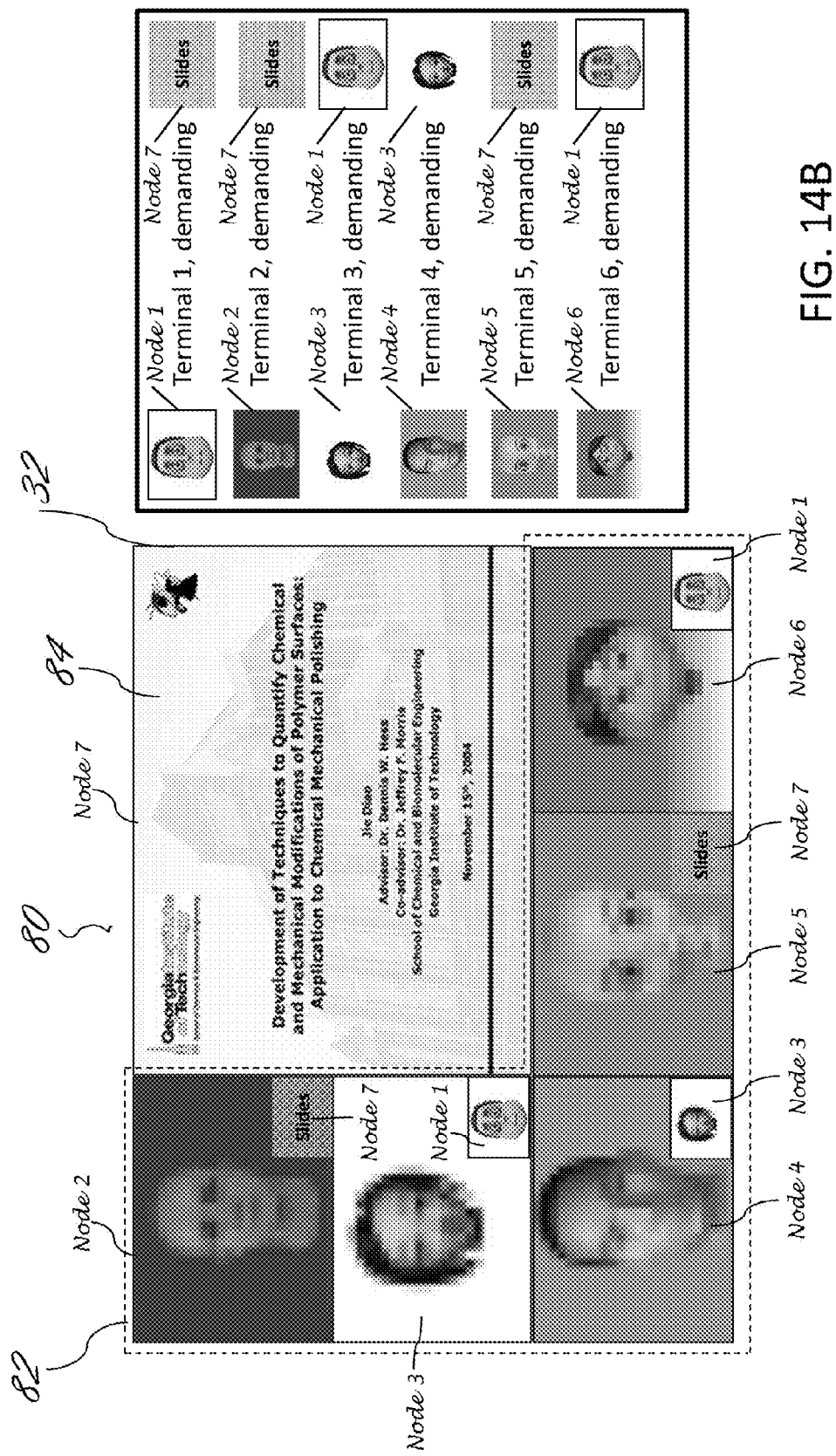
FIG. 14A depicts another exemplary view that is displayed at terminal 30-1 when node 7 is the active node.
FIGS. 14B and 15B map the interactions between the participants of FIGS. 14A and 15A, respectively.

FIG. 14A depicts an example of what may be shown on the video input and output device at terminal 30-1 of FIG. 1, as viewed by participant 1 during a conference. In the example of FIG. 14A, participant 1 is the host participant, and participants 2, 3, 4, 5, and 6 are the peer participants. Nodes 2, 3, 4, 5, and 6 correspond to the peer participants (participants 2, 3, 4, 5, and 6, respectively) and node 7 corresponds to a slide presentation.

As shown in FIG. 14A, a screen 80 includes a conference region 32, and images of the nodes in the conference are displayed in the conference region 32. The conference region 32 includes regions 82 and 84. The region 82 is allocated for images or videos of peer participants, and the region 84 is allocated for slides, whiteboard, etc. As shown in FIG. 14A, an image of node 7 is located in the region 84. The image of node 7 may correspond to a PowerPoint™ presentation slide. The presentation may be projected on a projection screen, or it may be a file shared by a participant with other participants.

FIG. 14A also shows the images of nodes 2-6 (peer participants 2-6) arranged in a tile-like ("L"-shaped) configuration in region 82, with the nodes arranged in numerical order from top left to bottom right. A thumbnail image is located at the bottom right corner of each node image, with the thumbnail image corresponding to another node that the participant (of that node image) is focusing on. For example, a thumbnail image of node 1 at the bottom right corner of node 6 indicates that participant 6 is focusing on participant 1.

In a delivered-on-demand setup according to some embodiments, only one node image may be displayed in high quality at a time, instead of all node images being displayed in high quality at the same time. In the example of FIG. 14A, participant 1 wants to focus on node 7 (slides) and has selected node 7 as the active node. Subsequently, the slides image in node 7 are displayed in high quality in the region 84, while the images of the non-active peer nodes are displayed in low quality in the region 82.

As previously described, the central server 20 can monitor which node (if any) is the active node at each terminal 30. In the example of FIG. 14A, the central server 20 monitors terminals 30-1 through 30-6 and receives information on which node is the active node at each of these terminals. The central server 20 then conveys this information through the thumbnail image at the bottom right corner of each node image. In the example of FIG. 14A, suppose that participants 2 and 5 are focusing on node 7 (slides), participants 3 and 6 are focusing on node 1 (participant 1), and participant 4 is focusing on node 3 (participant 3). As shown in FIG. 14A, a thumbnail image of node 7 at the bottom right corner of the images of nodes 2 and 5 indicates that participants 2 and 5 are focusing on the slides; a thumbnail image of node 3 at the bottom right corner of the image of node 4 indicates that participant 4 is focusing on participant 3; and a thumbnail image of node 1 at the bottom right corner of the images of nodes 3 and 6 indicates that participants 3 and 6 are focusing on participant 1.

In some embodiments, the thumbnail image of the host participant at his terminal may be displayed in high quality, while the thumbnail images of the peer participants are displayed in low quality. This allows the host participant to see his own (thumbnail) image in high quality at his terminal. For example, as shown in FIG. 14A, the thumbnail images of node 1 (the host participant at terminal 30-1) is displayed in high quality, while the thumbnail image of node 3 (peer participant) is displayed in low quality. The thumbnail images of node 7 are masked and denoted as "Slides."

FIG. 14B depicts another way of illustrating the gaze information of the participants in FIG. 14A. Specifically, FIG. 14B shows whom or what the host participant at each terminal is focusing on, and maps the interactions between the participants. Unlike FIG. 14A, FIG. 14B is a system-level depiction of the conference. Therefore FIG. 14B also includes participant 1 who is the host participant in FIG. 14A.

Figures 15A, 15B:
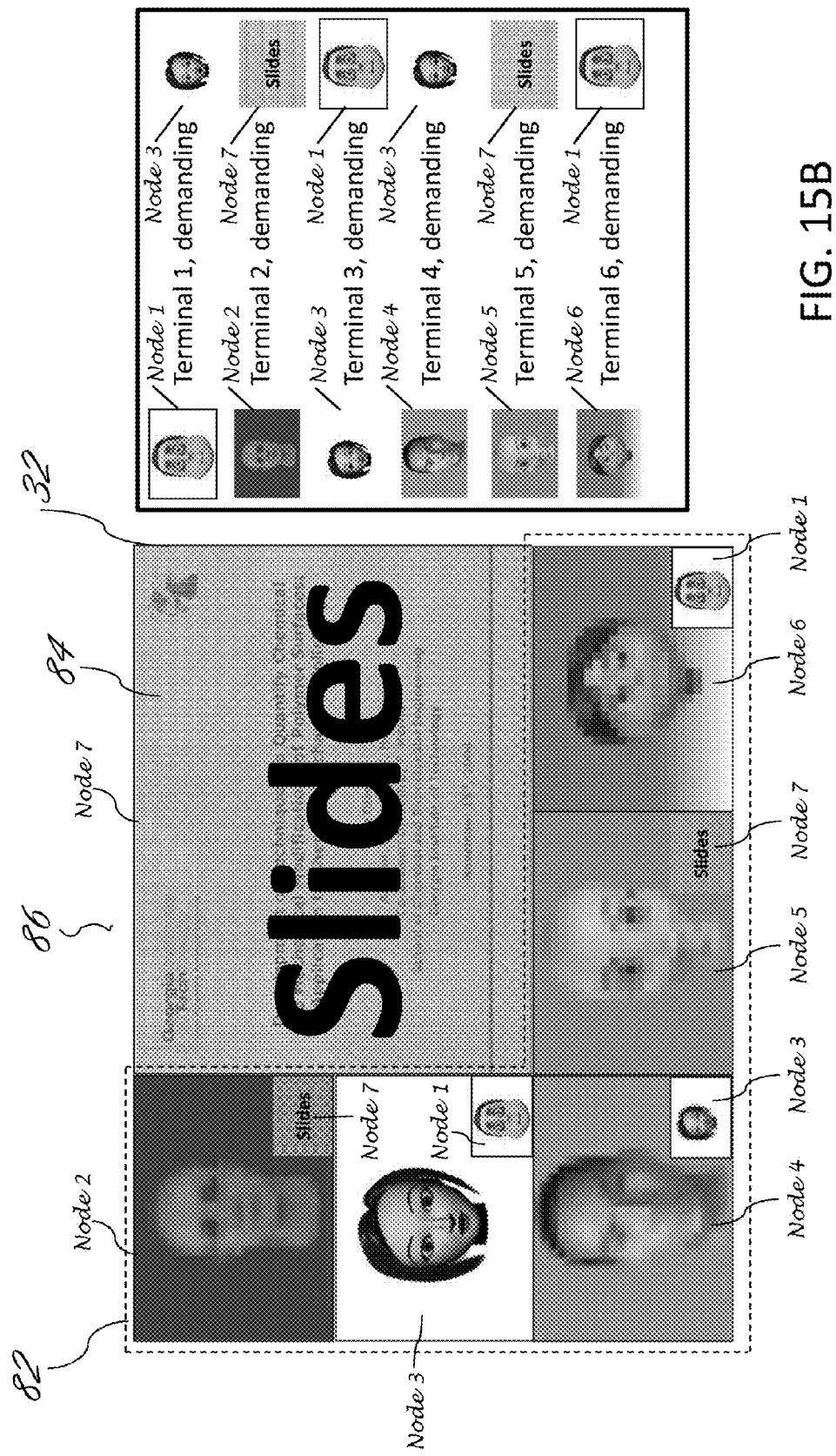
FIG. 15A depicts another exemplary view that is displayed at terminal 30-1 after participant 1 selects node 3 as the active node.

FIG. 15A illustrates what happens when participant 1 selects another node as the active node. Referring back to the example of FIG. 14A, suppose that participant 1 wants to focus on participant 3. After participant 1 has selected node 3 as an active node, screen 86 of FIG. 15A appears on the display device of terminal 30-1. As shown in FIG. 15A, the slides (node 7) in region 84 is now masked by the word "Slides" (and grayed out) to discourage participant 1 from focusing on the slides, while a high quality image of participant 3 (node 3) is delivered from terminal 3 and displayed in region 82. At the same time, the screens of the terminals 30 of the peer participants will automatically update to reflect participant 1's new active node selection. For example, in each of those screens (not shown), the thumbnail image of node 7 at the bottom right corner of the image of node 1 will change to a thumbnail image of node 3, to indicate that participant 1 has switched his attention from node 7 to node 3.

FIG. 15B depicts another way of illustrating the gaze information of the participants in FIG. 15A. Specifically, FIG. 15B shows whom or what the host participant at each terminal is focusing on, and maps the interactions between the participants. Comparing FIG. 15B with FIG. 14B, it can be observed that participant 1 has switched his attention from node 7 to node 3.

In some embodiments, only one thumbnail image is displayed in conference region 32, at the bottom right corner of the image of a node corresponding to the active node. To see what another node (e.g., node X) is focusing on, a host participant has to select node X as the active node. Subsequently, the thumbnail image may change to reflect the switch in active node. For example, FIG. 15A can be modified to describe the above embodiment. In the modified version of FIG. 15A, only the thumbnail image of node 1 is displayed at the bottom right corner of node 3 (active node), whereas the images of the non-active peer nodes will not have any thumbnail image displayed. If participant 1 wants to see what participant 5 is focusing on, participant 1 has to switch the active node from node 3 to node 5. After node 5 has been selected as the new active node, the thumbnail image of node 1 at the bottom right corner of the image of node 3 disappears. Instead, a thumbnail image of node 7 will appear at the bottom right corner of the image of node 5, which indicates to participant 1 that participant 5 is focusing on the slides (node 7). As a result, participant 1 can select different nodes as the active node to find out whom (or what) the participants at those nodes are focusing on. Likewise, the peer participants in the conference can do the same at their respective terminals 30. The embodiments described above may encourage participants to "explore" and focus on other nodes during the conference, and result in a more engaging video conferencing experience.

In some other embodiments, thumbnail images are selectively displayed in the conference region 32 only when certain criteria are met. For example, a non-active peer node may have an active node that is associated with either an inanimate object (e.g., a PowerPoint™ presentation slide) or a peer participant. If the active node of the non-active peer node is associated an inanimate object, a host participant will see a thumbnail image of the inanimate object displayed at the bottom right corner of the image of the non-active peer node. However, if the active node of the non-active peer node is associated with a peer participant, a thumbnail image of the peer participant will not be displayed at the bottom right corner of the image of the non-active peer node. In order to display the thumbnail image of the peer participant at the bottom right corner of the image of the non-active peer node, the host participant has to first select the non-active peer node as the host participant's active node.

It is noted that conveying gaze information with static screen display (in the embodiments of FIGS. 14A and 15A) may not appear as natural when compared to the embodiment of FIG. 6. This is because with static screen display, the screen may not be able to show participants turning their heads or faces (or rolling their eyes) when they switch attention from one node to another node. Nonetheless, the static screen display embodiments described in FIGS. 14A and 15A can allow each participant to see what other participants are focusing on.

Video Conferencing System with Dynamic Screen Layout

In the embodiments of FIGS. 2-6, 11, and 12, all the nodes are aligned on a same horizontal plane on the screen, and the relative positions of nodes can be dynamically adjusted when a node is selected as an active node. Aligning all the nodes on the same horizontal plane can enhance video conferencing experience by maintaining relative spatial information throughout the conference (e.g., participant A is always on the right of participant B). However, a desktop system with large screen area may be required to accommodate all nodes on the same horizontal plane, especially if there are a large number of nodes. As previously mentioned, precise gaze information can be obtained through the use of core and non-core cameras. However, if the core and non-core cameras consist of physical imaging devices (such as cameras), additional physical space may be required for multiple camera installations.

For video conferencing solutions on mobile devices (such as laptops, tablets, and smartphones), a large display device screen and physical space for multiple camera installations may not always be available. This is because mobile devices typically have limited screen sizes and at most one front camera per device. As a result, it may not be possible to align all the nodes on the same horizontal plane on a mobile device screen, or use multiple physical imaging devices with the mobile device.

The embodiments of the invention can address the above problems of limited screen size and lack of physical imaging devices. Specifically, the embodiments described below with reference to FIGS. 16A-25B show how a delivered-on-demand video conference model, coupled with dynamic screen layout, can be used to convey accurate gaze information on devices having limited screen size and only one front camera.

FIGS. 16A, 17A, 18A, 19A, 20A, and 21A illustrate how the screen layout changes in different scenarios on devices with a front camera centered along the long side of the screen. Examples of these devices include some desktop computers, most laptops, Microsoft Surface Pad™, and Kindle Fire HD™. FIGS. 22A, 23A, 24A, and 25A demonstrate how the screen layout changes in different scenarios on other devices with a front camera centered along the short side of the screen. Examples of these other devices include most smartphones, Apple iPad™, and Google Nexus 7™.

Figure 16B:
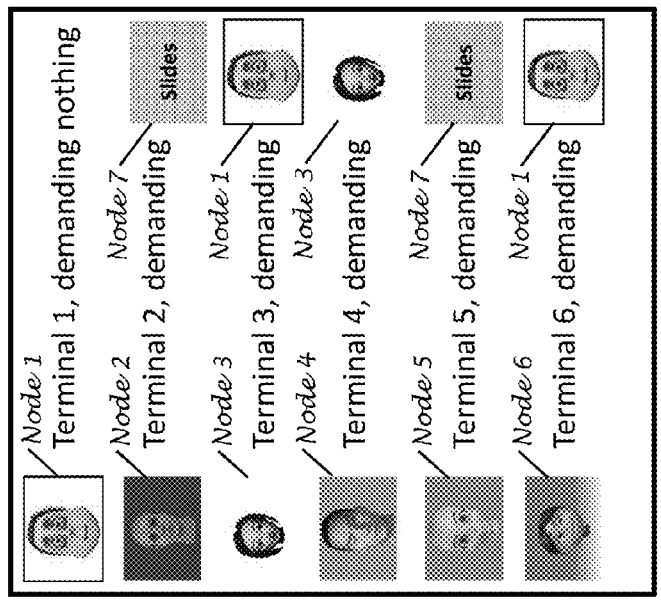
FIGS. 16B, 17B, 18B, 19B, 20B, and 21B map the interactions between the participants of FIGS. 16A, 17A, 18A, 19A, 20A, and 21A, respectively.
Figure 16A:
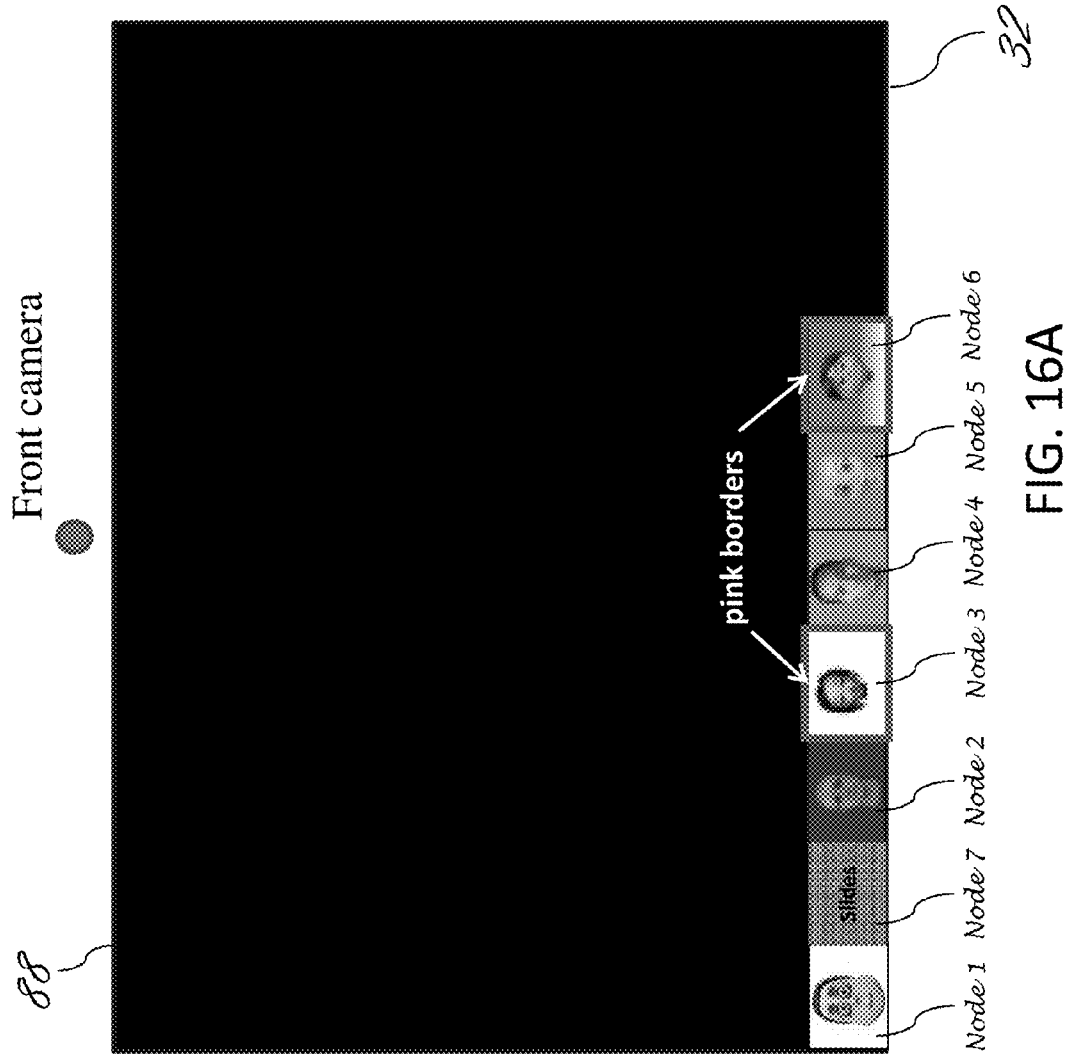
FIG. 16A depicts another exemplary view that is displayed at terminal 30-1 when participant 1 is not focusing on any node.

FIG. 16A depicts an example of what may be shown on the video input and output device at terminal 30-1 of FIG. 1, as viewed by participant 1 during a conference on a mobile device. In the example of FIG. 16A, participant 1 is the host participant, and participants 2, 3, 4, 5, and 6 are the peer participants. Node 1 corresponds to the host participant, nodes 2, 3, 4, 5, and 6 correspond to the peer participants (participants 2, 3, 4, 5, and 6, respectively), and node 7 corresponds to presentation slides. As previously mentioned, the image in node 7 may correspond to a PowerPoint™ presentation slide. The presentation may be projected on a projection screen, or it may be a file that is shared by a participant with other participants.

As shown in FIG. 16A, images of the nodes 2-7 are displayed in a tile-like configuration on a bottom portion of a conference region 32. Unlike the examples of FIGS. 2-6, the nodes in FIG. 16A are not arranged in any predefined order. In some embodiments, the nodes can be positioned in order from left to right based on when a participant logs on to the conference. In some other embodiments, the nodes may be positioned in random at the bottom portion of the conference region 32, or at any portion of the conference region 32.

In the example of FIG. 16A, participant 1 has not selected any of nodes 2-7 as an active node, and is not focusing on any node. As shown in FIG. 16A, node 7 (slides) is masked with the word "Slides," and the image quality of nodes 2-6 are similar, in that the node images are of low resolution and low frame rate. This allows bandwidth and network resources to be conserved.

The screen 88 of FIG. 16A can also correspond to different scenarios during the conference (e.g., when participant 1 first logs on to the conference; when participant 1 switches back to the conference screen from another non-conference mobile application; or when the active node that participant 1 is focusing on has logged off from the conference).

As shown in FIG. 16A, the images of nodes 3 and 6 have pink borders, which indicate both participants 3 and 6 are focusing on participant 1 at that instance. The pink border is consistent with the coloring scheme described previously with reference to FIG. 10.

In the example of FIG. 16A, the system 10 does not display the gaze information of all the participants, except the "who-is-focusing-on-me information" conveyed through the pink borders. As a result, if a host participant (e.g., participant 1) wants to find out what another peer participant is focusing on, the host participant has to focus on the peer participant by first selecting the peer participant as an active node. This concept is similar to the interaction between participants in a face-to-face meeting, whereby a participant has to first focus on the other participant to find out what the other participant is focusing on.

FIG. 16B depicts another way of illustrating the gaze information of the participants in FIG. 16A. Specifically, FIG. 16B shows who or what each host participant is focusing on, and maps the interactions between the participants. Consistent with FIG. 16A, FIG. 16B shows that participant 1 has not selected any of nodes 2-7 as an active node, and is not focusing on any node.

Figure 17B:
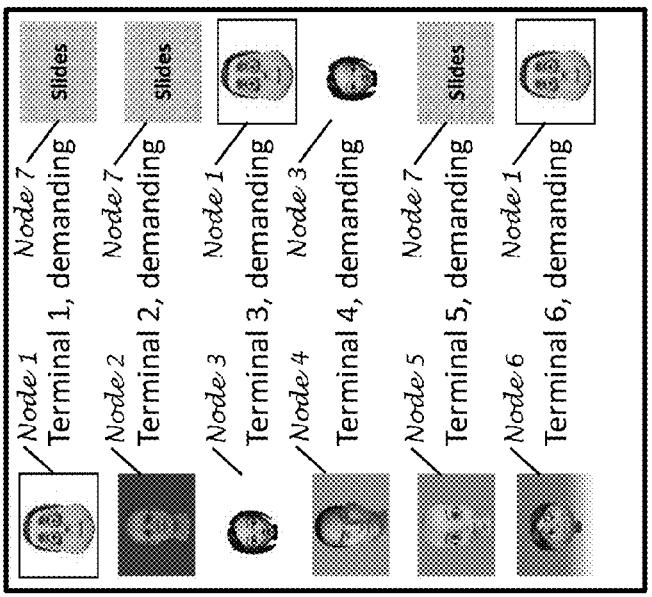
Figure 17A:
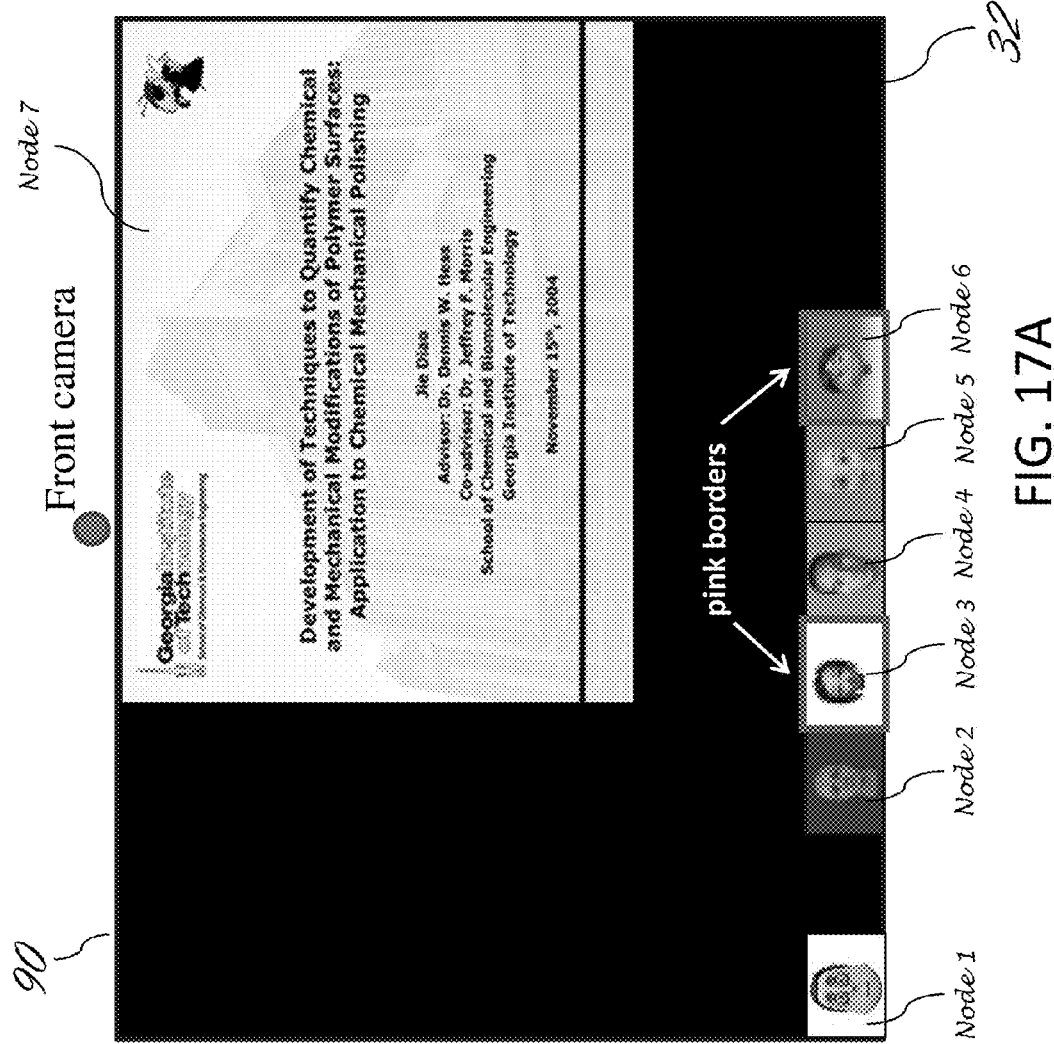
FIG. 17A depicts a further exemplary view that is displayed at terminal 30-1 after participant 1 selects node 7 as an active node.

FIG. 17A illustrates what happens when participant 1 selects a node as an active node. Referring back to the example of FIG. 16A, suppose that participant 1 wants to focus on node 7. After participant 1 has selected node 7 as the active node, screen 90 of FIG. 17A appears on the display device of terminal 30-1. As shown in FIG. 17A, the image of node 7 is resized and relocated to an upper portion of a conference region 32 on the screen 90. Also, the previously masked image of node 7 is now unmasked to display the details in the slides. The image of node 7 can be configured to occupy a large portion of the conference region 32, so as to differentiate node 7 as the active node, and also to allow participant 1 to see the image of node 7 more clearly. The image of the active node (node 7) is streamed in high quality, while the images of the non-active peer nodes (nodes 2, 3, 4, 5, and 6) continue to be streamed in low quality. This helps to conserve bandwidth and network resources.

As further shown in FIG. 17A, the image of the slides is aligned slightly to the right of screen 90 instead of being centered on screen 90. This alignment offset allows the front camera to capture "watching-elsewhere" images of participant 1 when participant 1 is focusing on the slides.

FIG. 17B depicts another way of illustrating the gaze information of the participants in FIG. 17A. Specifically, FIG. 17B shows who or what each host participant is focusing on, and maps the interactions between the participants. Comparing FIG. 17B with FIG. 16B, it is observed that participant 1 has selected node 7 as the active node and is now focusing on the slides.

Figure 18B:
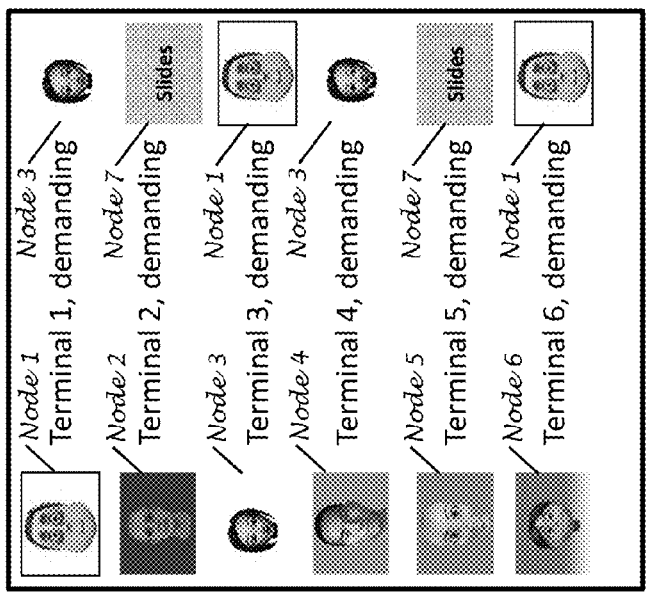
Figure 18A:
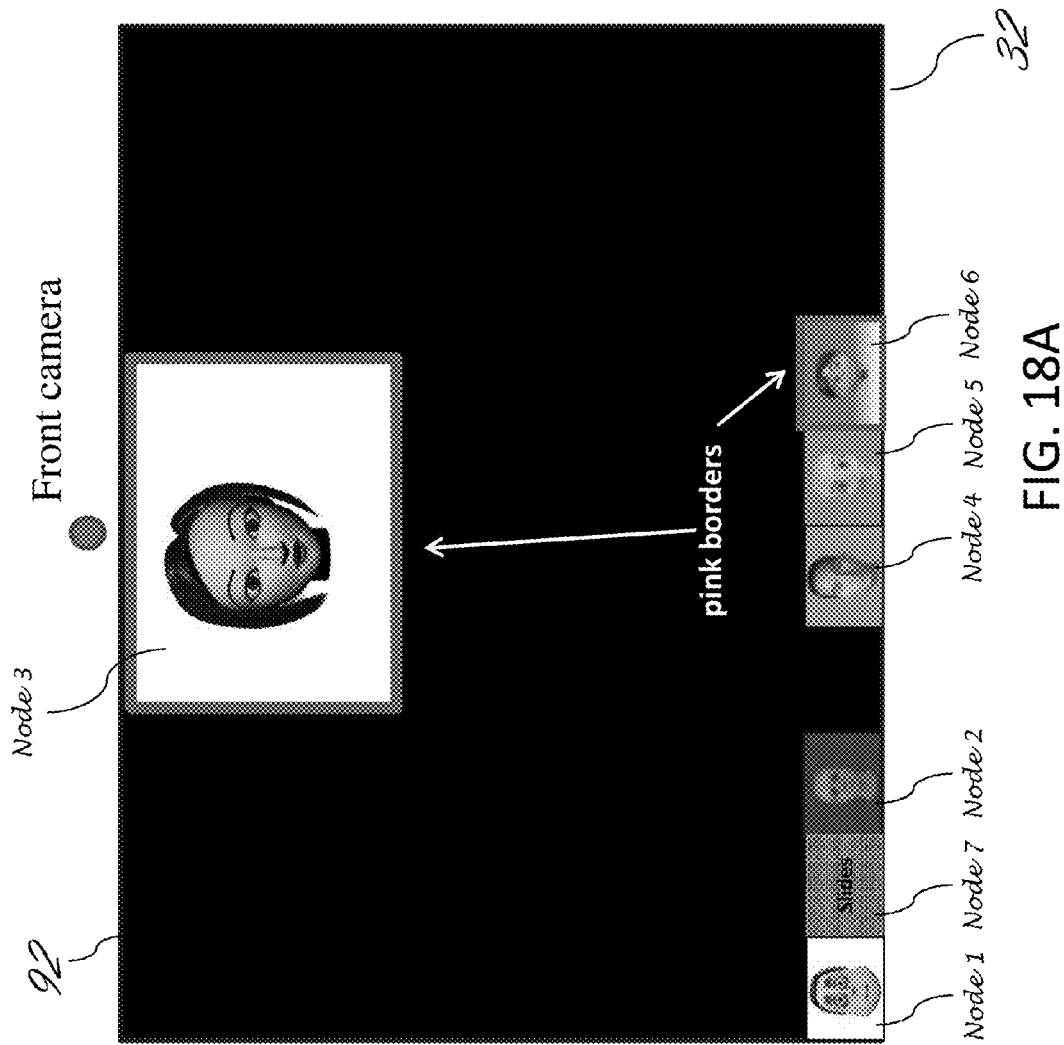
FIG. 18A depicts a further exemplary view that is displayed at terminal 30-1 after participant 1 changes the active node to node 3.

FIG. 18A illustrates what happens when participant 1 selects another node as the active node. Referring back to the example of FIG. 17A, suppose that participant 1 wants to focus on node 3. After participant 1 has selected node 3 as the active node, screen 92 of FIG. 18A appears on the display device of terminal 30-1. As shown in FIG. 18A, the image of node 3 is resized and relocated to an upper center portion of a conference region 32 in screen 92. The image of node 7 (in FIG. 17A) is now replaced by the image of node 3 (in FIG. 18A) since participant 1 wants to focus on participant 3. As further shown in FIG. 18A, the image of the active node (node 3) is rendered at a higher image quality than the images of the non-active peer nodes.

As further shown in FIG. 18A, the image of node 3 is aligned to the center of the screen 92 (directly below a front camera on the display device). If participant 1 focuses on the image of node 3, the front camera on the display device at terminal 30-1 will capture "watching-me" images of participant 1. Terminal 30-1 will transmit the "watching-me" images of participant 1 to the central server 20, which then transmits the images to terminal 30-3. Since participant 3 also selects node 1 as an active node, the image of node 1 will resize and relocate to an upper center portion of the screen directly below the front camera at terminal 30-3. When viewing from terminal 30-3 (not shown), participant 3 will see a front facial image of participant 1 (the "watching-me" image of participant 1 captured by the front camera of terminal 1), such that participant 1's eye contact appears to be guided towards him (participant 3). If participant 3 also focuses on the image of node 1, the front camera at terminal 30-3 will capture "watching-me" images of participant 3. Terminal 30-3 in turn transmits the "watching-me" images of participant 3 to the central server 20, which then transmits the images to terminal 30-1. When viewing from terminal 30-1, participant 1 will see a front facial image of participant 3 (the "watching-me" image of participant 3 captured by the front camera of terminal 3), such that participant 3's eye contact appears to be guided towards him (participant 1). As a result, participants 1 and 3 will be under the impression that they are focusing on each other, which aligns with the intentions of both participants.

FIG. 18B depicts another way of illustrating the gaze information of the participants in FIG. 18A. Specifically, FIG. 18B shows who or what each host participant is focusing on, and maps the interactions between the participants. Comparing FIG. 18B with FIG. 17B, it is observed that participant 1 has switched his attention from the slides to node 3.

Figure 19B:
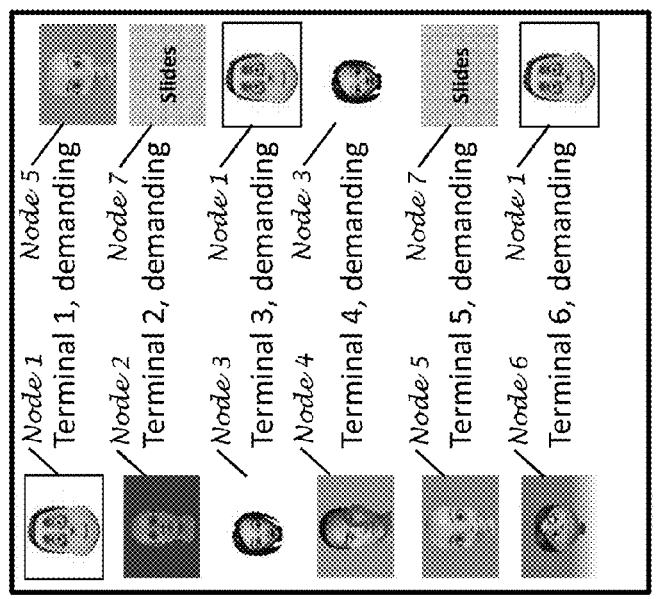
Figure 19A:
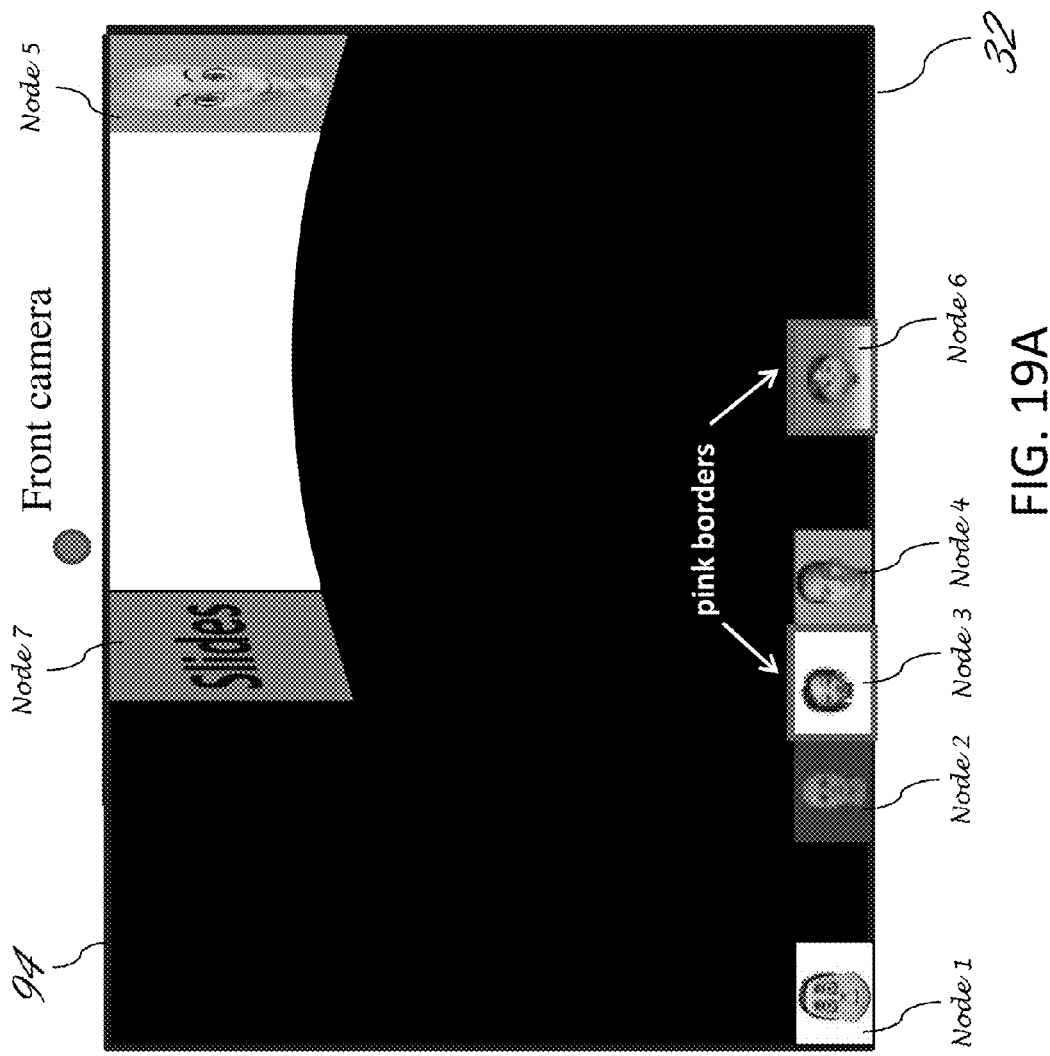
FIG. 19A depicts a further exemplary view that is displayed at terminal 30-1 when participant 1 is focusing on participant 5, and participant 5 is focusing on node 7.

FIG. 19A illustrates an example of an object node. Referring back to the example of FIG. 18A, suppose that participant 1 wants to focus on node 5. Participant 5, however, is focusing on node 7 (slides). From the viewpoint of participant 1, node 7 is the "object node." After participant 1 selects node 5 as the active node, screen 94 of FIG. 19A appears on the display device of terminal 30-1. As shown in FIG. 19A, the images of nodes 5 and 7 are resized and relocated to an upper portion of a conference region 32 on screen 94. The image of node 3 (in FIG. 18A) is now replaced by an image of participant 5 focusing on the slides (in FIG. 19A). As further shown in FIG. 19A, the image of the active node (node 5) is rendered at a higher resolution than the images of the non-active peer nodes.

In FIG. 19A, the image of node 5 appears to be rotated sideways with respect to a vertical axis, such that participant 5 appears to face in the direction of the slides. This "watching-elsewhere" image of participant 5 can be achieved by displaying the slides on the display device of terminal 30-5 (in a similar configuration as shown in FIG. 17A), in which the image of the slides is aligned slightly to the right of the screen. The alignment offset allows the front camera at terminal 30-5 to capture "watching-elsewhere" images of participant 5 after participant 5 has focused on the slides. Terminal 30-5 will transmit the "watching-elsewhere" images of participant 5 to the central server 20, which then transmits the images to terminal 30-1. At terminal 30-1, the image of participant 5 is positioned at the far right upper portion of the conference region 32, with the slides image positioned to the left of node 5, such that participant 5 appears to be focusing on the slides image (as shown in FIG. 19A). In some embodiments, a white region with a bottom curved edge between node 7 and node 5 (as shown in FIG. 19A) can be added to reinforce participant 1's impression that participant 5 is focusing on the slides.

Similarly, if participant 1 focuses on the image of node 5, the front camera at terminal 30-1 may capture "watching-elsewhere" images of participant 1. This is because the image of participant 5 is positioned at the far right upper portion of the conference region 32 in FIG. 19A, away from the front camera. Terminal 30-1 will transmit the "watching-elsewhere" images of participant 1 to the central server 20, which then transmits the images to the other terminals. In the example of FIG. 19A, participants 3 and 6 have selected node 1 as their active nodes. Subsequently, participants 3 and 6 will see the "watching-elsewhere" image of participant 1 rotated sideways (with respect to a vertical axis) on the screen at their respective terminals 30-3 and 30-6.

FIG. 19B depicts another way of illustrating the gaze information of the participants in FIG. 19A. Specifically, FIG. 19B shows who or what each participant is focusing on, and maps the interactions between the participants. Comparing FIG. 19B with FIG. 18B, it is observed that participant 1 has switched his attention from node 3 to node 5, and participant 5 is focusing on node 7 (slides).

Figure 20B:
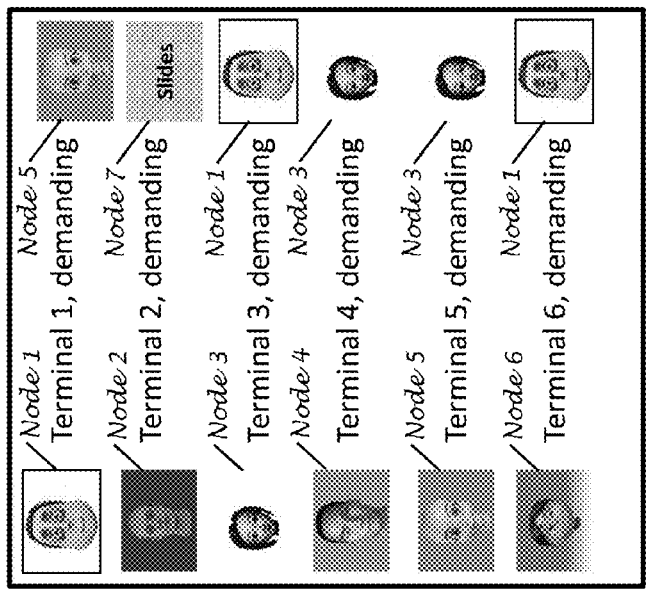
Figure 20A:
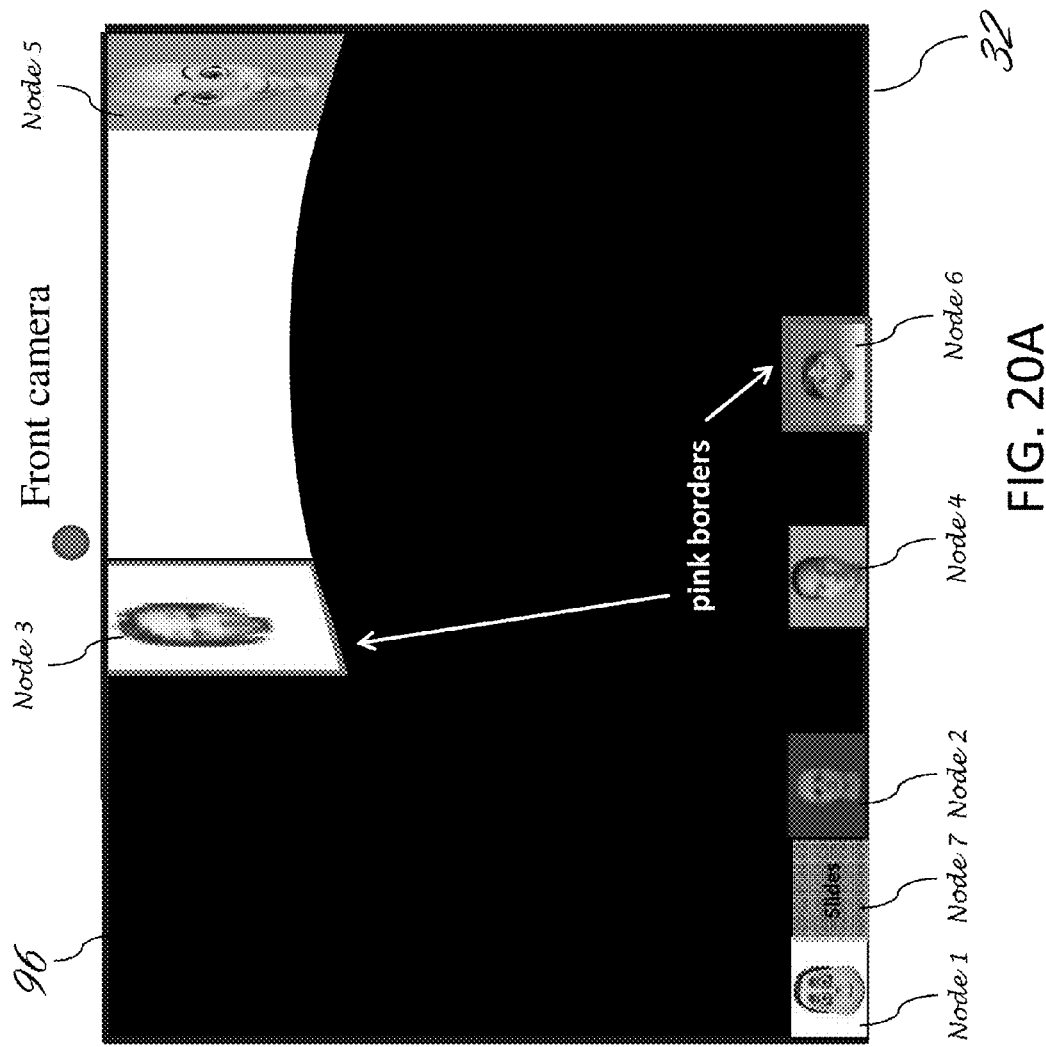
FIG. 20A depicts a further exemplary view that is displayed at terminal 30-1 when participant 1 is focusing on participant 5, and participant 5 is focusing on participant 3.

FIG. 20A illustrates a switch in the object node. Referring back to the example of FIG. 19A, suppose that participant 5 (participant 1's active node) wants to focus on node 3. After participant 5 selects node 3 as the active node, screen 96 of FIG. 20A appears on the display device of terminal 30-1. As shown in FIG. 20A, the image of node 3 has been resized and relocated to an upper portion of a conference region 32 on screen 96, to replace the slides image in FIG. 19A. Specifically, FIG. 20A shows the image of participant 5 (active node) focusing on participant 3 (object node). As further shown in FIG. 20A, the image of the active node (node 5) continues to be rendered at a higher resolution than the images of the non-active peer nodes.

As shown in FIG. 20A, the image of node 5 is positioned at the far upper right portion of the conference region 32, with the image of node 3 positioned to the left of node 5, such that participant 5 appears to be focusing on participant 3. Similar to FIG. 19A, a white region with a bottom curved edge between node 3 and node 5 (as shown in FIG. 20A) can be added to reinforce participant 1's impression that participant 5 is focusing on participant 3.

In some embodiments, if the participants in the active node and the object node are focusing on each other, a non-core camera (using, for example, Algorithm D of FIG. 8 or Algorithm F of FIG. 9) can be used to generate side facial images (e.g., image 58 of FIG. 8 or image 66 of FIG. 9) of the participants at the active node and the object node. These side facial images are then transmitted to the terminal 30 of the host participant, and displayed such that the participants at the active node and the object node appear to be focusing on each other. For example, with reference to FIG. 20A, suppose that participants 3 and 5 are focusing on each other. Based on the embodiment described in FIG. 18A, "watching-me" images of participants 3 and 5 will be captured at respective terminals 30-3 and 30-5, and transmitted to terminal 30-1 (the host participant's terminal). However, these "watching-me" images do not convey to participant 1 the actual gaze information between participants 3 and 5. This is because when viewing from terminal 30-1, participant 1 will see front facial images of both participants 3 and 5, such that participant 3 and participant 5's eye contact appears to be guided towards him (participant 1). As a result, participant 1 will be under the impression that both participants 3 and 5 are focusing on him (participant 1), when in reality participants 3 and 5 are looking at each other. To correct the anomaly in gaze information, a non-core camera (using, for example, Algorithm D of FIG. 8 or Algorithm F of FIG. 9) can be used to generate side facial images of participants 3 and 5. These side facial images can then be transmitted to the terminal 30-1 to provide accurate gaze information, thereby giving participant 1 the impression that participants 3 and 5 are focusing on each other (as shown in FIG. 20A).

FIG. 20B depicts another way of illustrating the gaze information of the participants in FIG. 20A. Specifically, FIG. 20B shows who or what each host participant is focusing on, and maps the interactions between the participants. Comparing FIG. 20B with FIG. 19B, it is observed that participant 5 has switched his attention from the slides to node 3.

Figure 21B:
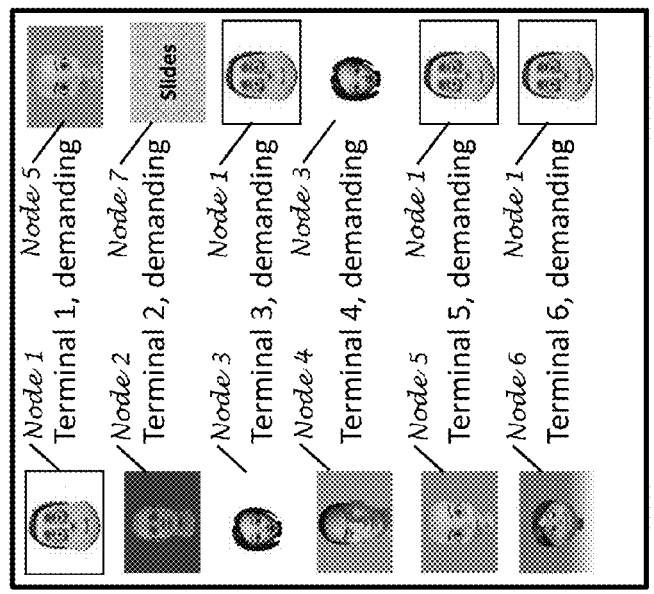
Figure 21A:
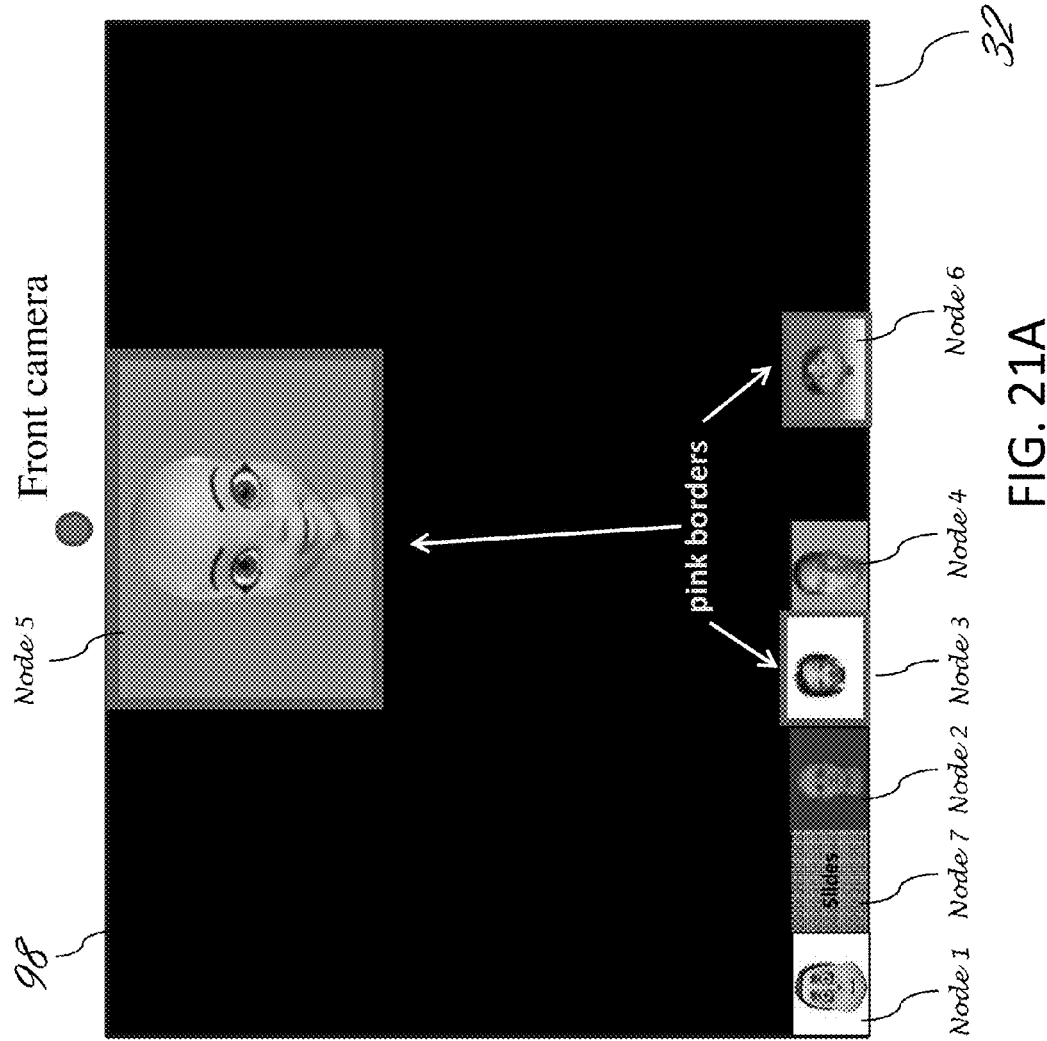
FIG. 21A depicts a further exemplary view that is displayed at terminal 30-1 when participants 1 and 5 are focusing on each other.
Figure 22B:
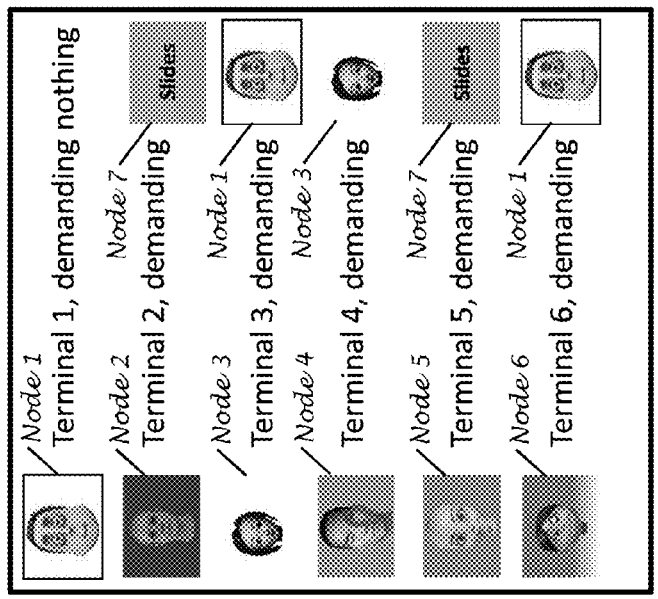
FIGS. 22B, 23B, 24B, and 25B map the interactions between the participants of FIGS. 22A, 23A, 24A, and 25A, respectively.
Figure 22A:
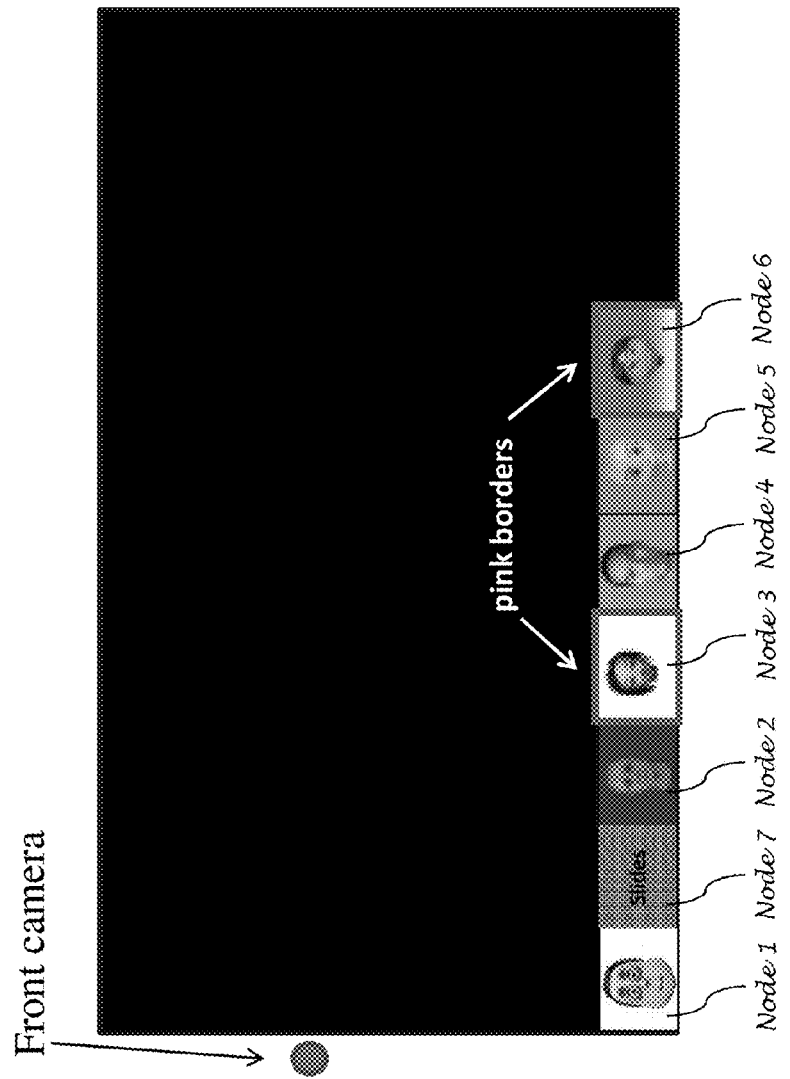
FIGS. 22A, 23A, 24A, and 25A illustrate embodiments that are similar to those of FIGS. 16A, 17A, 18A, and 19A, respectively.
Figure 23A:
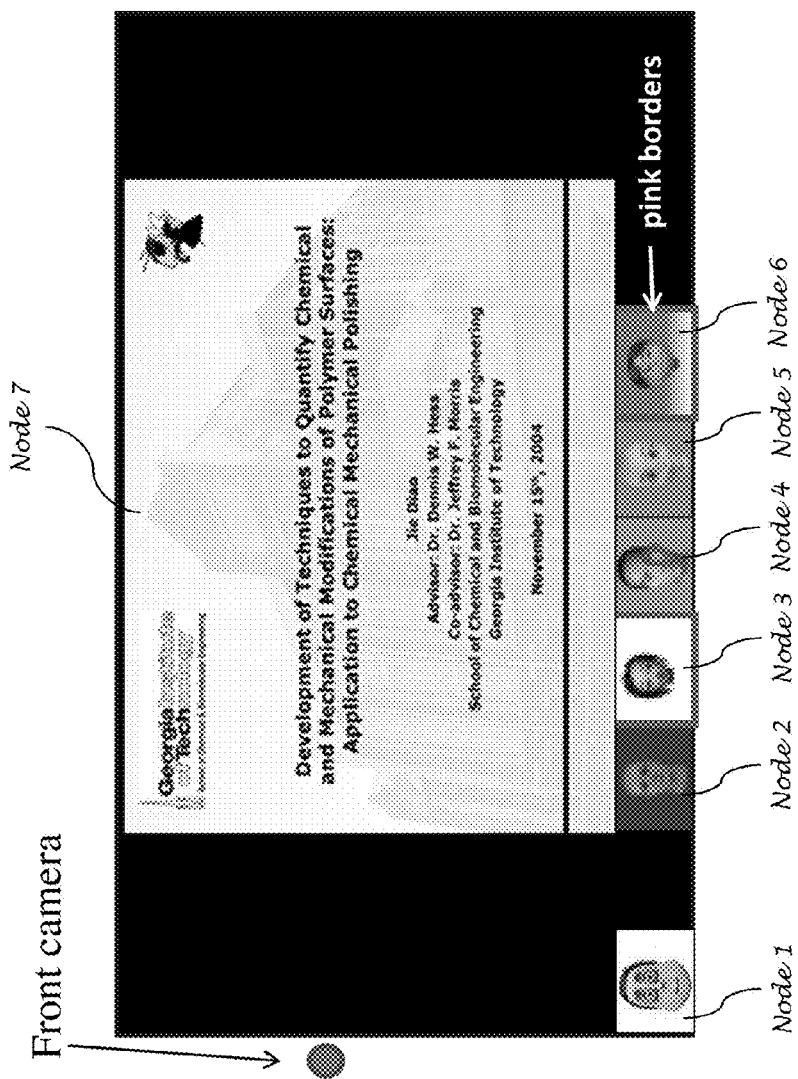
Figure 23B:
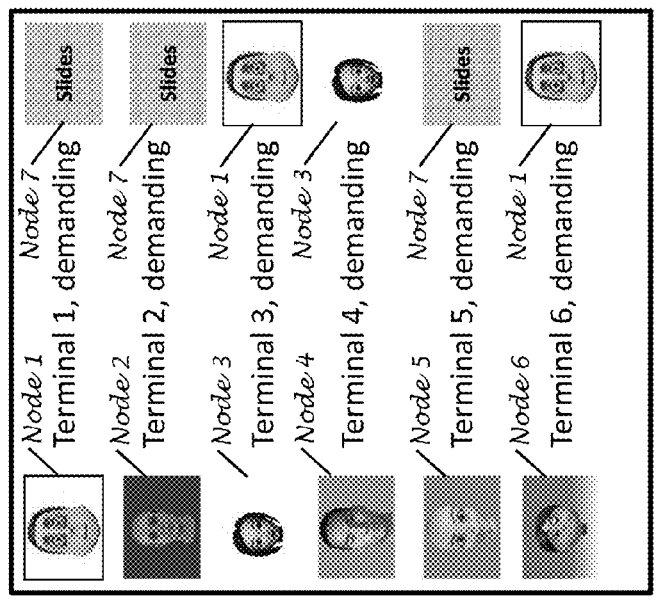
Figures 24A, 24B:
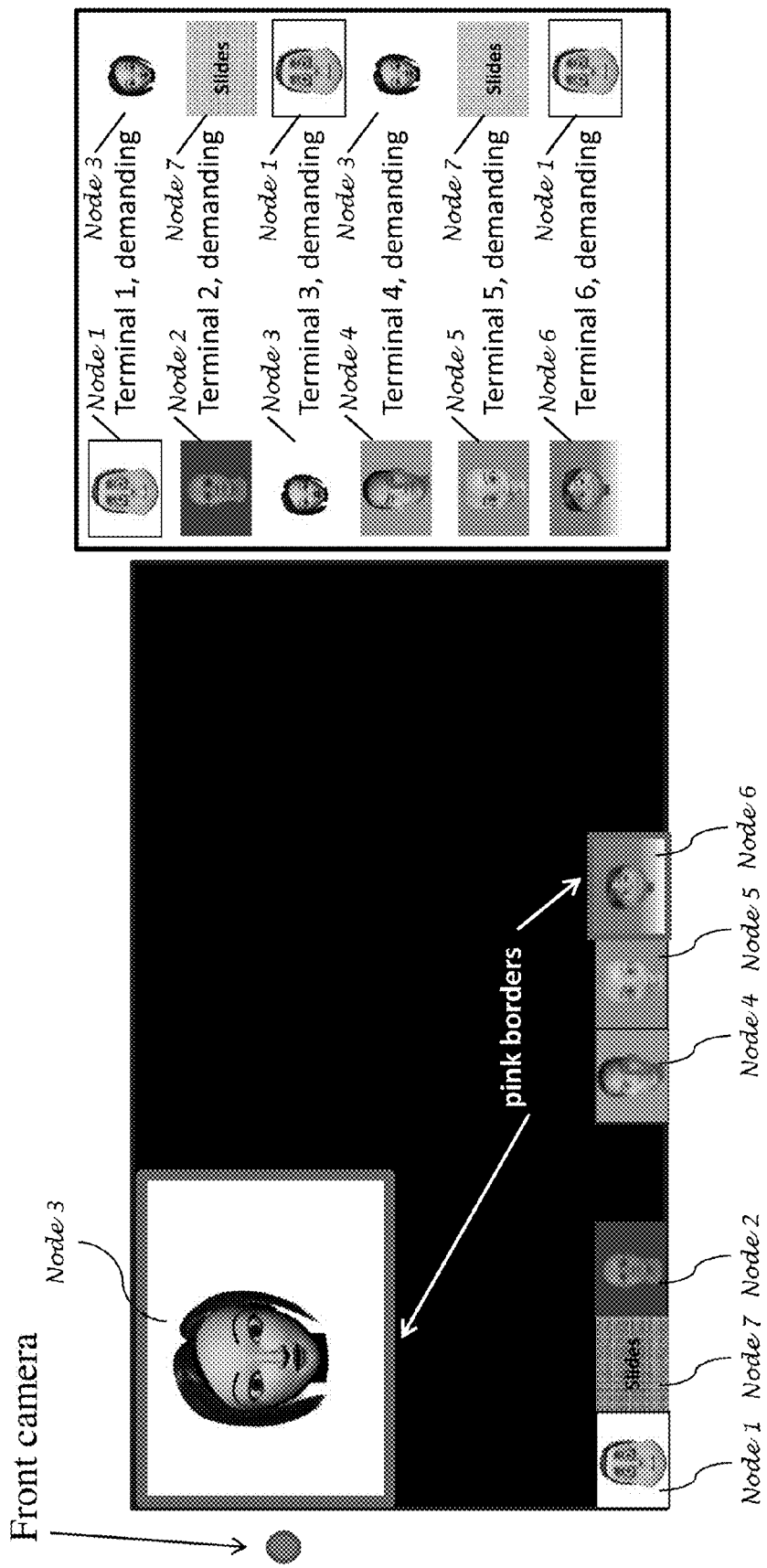
Figure 25B:
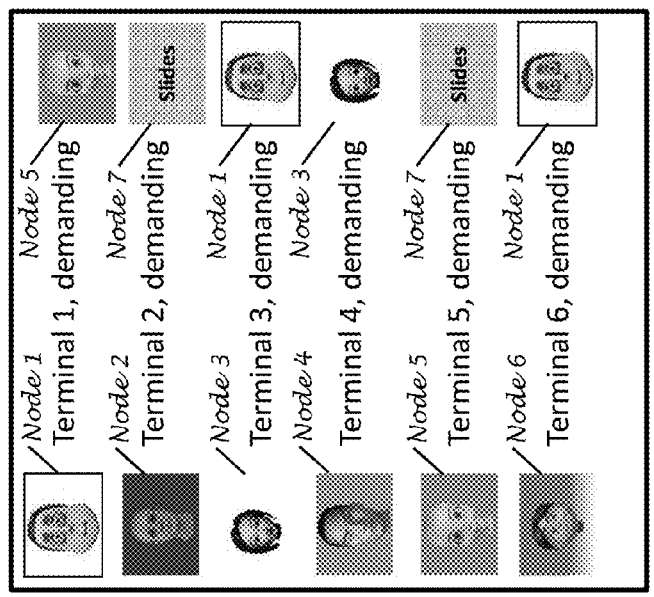
Figure 25A:
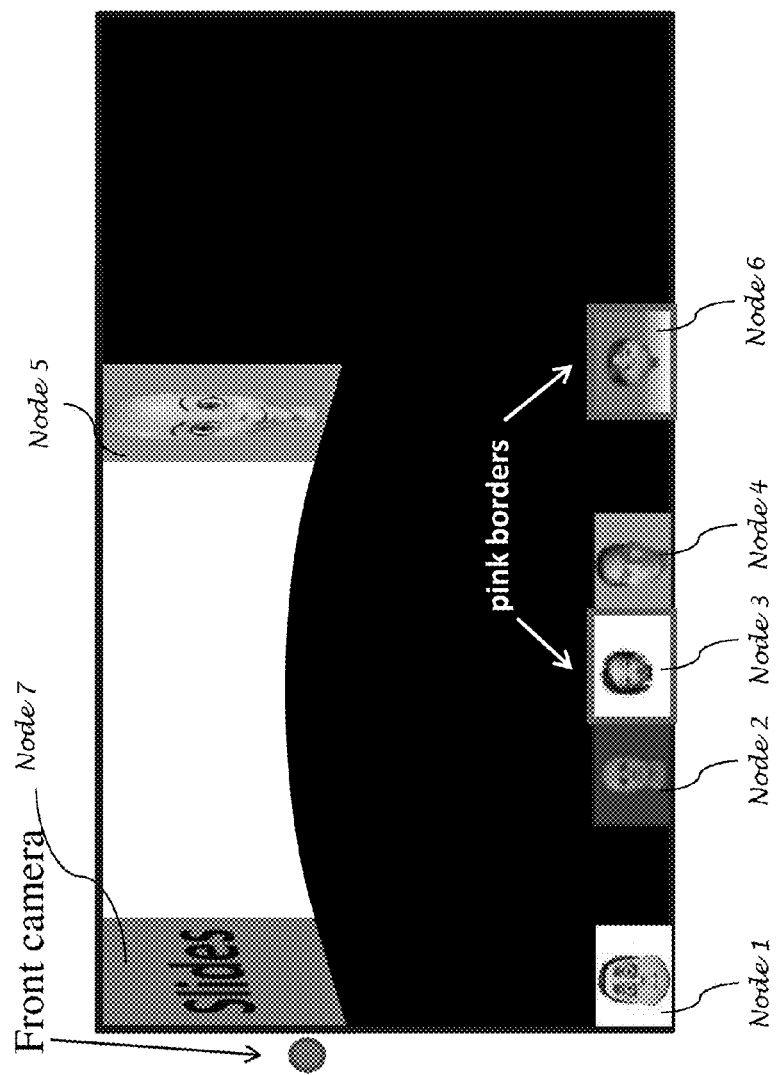

FIG. 21A illustrates a host participant and the active node participant focusing on each other. Referring back to the example of FIG. 20A, suppose that participant 5 wants to focus on node 1. After participant 5 has selected node 1 as the active node, screen 98 of FIG. 21A appears on the display device of terminal 30-1. The images of nodes 3 and 5 (in FIG. 20A) are now replaced by the image of node 5 (in FIG. 21A) which is aligned in the center of screen 98 (directly below the front camera). This allows the front camera at terminal 30-1 to capture a "watching-me" image of participant 1 if participant 1 focuses on participant 5. As further shown in FIG. 21A, the image of the active node (node 5) continues to be rendered at a higher resolution than the image of the non-active peer nodes. Similarly, at terminal 30-5 (not shown), the image of node 1 is resized and relocated to an upper center portion of a screen directly below a front camera. This allows the front camera at terminal 30-5 to capture a "watching-me" image of participant 5 if participant 5 focuses on participant 1.

With reference to FIG. 20A, when viewing from terminal 30-1, participant 1 will see a front facial image of participant 5 (the "watching-me" image of participant 5 captured by the front camera of terminal 5), such that participant 5's eye contact appears to be guided towards him (participant 1). When viewing from terminal 30-5, participant 5 will see a front facial image of participant 1 (the "watching-me" image of participant 1 captured by the front camera of terminal 1), such that participant 1's eye contact appears to be guided towards him (participant 5). Subsequently, participants 1 and 5 will be under the impression that they are focusing on each other, which aligns with the intentions of both participants.

FIG. 21B depicts another way of illustrating the gaze information of the participants in FIG. 21A. Specifically, FIG. 21B shows who or what each host participant is focusing on, and maps the interactions between the participants. Comparing FIG. 21B with FIG. 20B, it is observed that participant 5 has switched his attention from node 3 to node 1.

Throughout the video conference, the screen layout on all terminals 30 can change in different configurations similar to the embodiments described above. This enables the participants in the conference to explore in real-time "who-is-focusing-on-whom-or-what" information.

FIGS. 22-25 show exemplary views (as viewed by participant 1 on another mobile device) for the cases described in FIGS. 16-19, respectively. The difference between the embodiments in FIGS. 16-19 and the embodiments in FIGS. 22-25 is the location of the front camera and the position of the active node and object node. As previously described, the front camera in FIGS. 16-19 is located along the long side of the screen, and the active node and object node are positioned in an upper (and upper left) portions of the screen. On the other hand, the front camera in FIGS. 22-25 is located along the short side of the screen, and the active node and the object node have been re-positioned according to the location of the front camera. Other than the above differences, all other aspects of the embodiments in FIGS. 16-19 are the same as the embodiments described in FIGS. 22-25.

Figure 26:
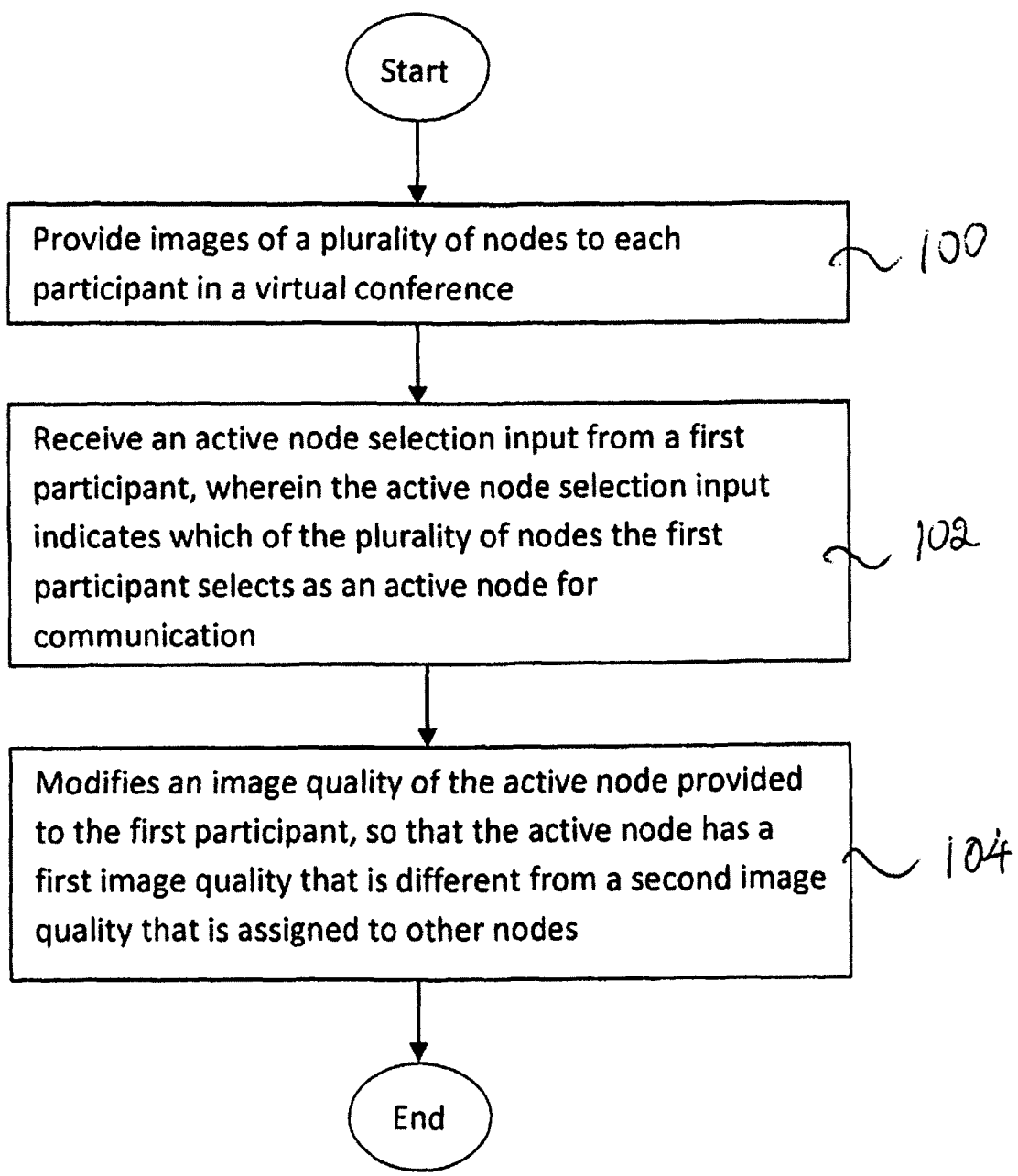
FIG. 26 is a flowchart of a virtual conferencing process according to some embodiments.

FIG. 26 is a flowchart depicting a virtual conferencing process in accordance with the invention. In the process, the central server 20 provides images of a plurality of nodes (see, e.g., screen 40 of FIG. 2, screen 88 of FIG. 16A, etc.) to each participant of a plurality of participants (step 100). Next, the central server 20 receives an active node selection input from a first participant (step 102). The active node selection input indicates which of the plurality of nodes the first participant selects as an active node for communication. Next, the central server 20 modifies an image quality of the active node provided to the first participant, so that the active node has a first image quality that is different from a second image quality that is assigned to other nodes (step 104). The image quality includes at least one factor that would affect the perceived clarity by a viewer, including but not limited to resolution, brightness, contrast, tone, sharpness, noise level, mask state, and frame rate of an image.

The central server 20 may modify the image quality of the active node as follows. For example, the central server 20 may first determine if a node that is selected as an active node lies in a core region (e.g., core region 34) on the screen. If the selected node is in the core region, the central server 20 modifies the image quality and image size of the selected node on the screen provided to the first participant. If the selected node is not in the core region, the central server 20 relocates the selected node to the core region first before modifying the image quality and image size of the selected node on the screen provided to the first participant (see, e.g., FIG. 4). In some embodiments, the image position, size, and quality of a node can be modified concurrently once the node has been selected as an active node. As previously described, modifying the image size of the selected node may include increasing the size of the image of the selected node (active node) relative to a size of the images of non-active peer nodes (see, e.g., FIG. 3). Also, modifying the image quality of the selected node may include increasing a resolution or frame rate of the image of the selected node (active node) relative to the resolution or frame rate of the images of the non-active peer nodes (see, e.g., FIG. 3).

Embodiments of the invention and all of the functional operations described in this specification can be implemented in digital electronic circuitry, or in computer software, firmware, or hardware, including the structures disclosed in this specification and their structural equivalents, or in combinations of one or more of them. The central server of the invention can be implemented as a combination of computer hardware including a processor and a memory with one or more computer program products, i.e., one or more modules of computer program instructions encoded on a computer-readable medium for execution by, or to control the operation of, data processing apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction among terminals 30, embodiments of the invention can be implemented using a computer having a display device, e.g., a CRT (cathode ray tube), LCD (liquid crystal display), projection screen, OLED display, 3D display, etc. for displaying information to the participants. A keyboard and a pointing device, e.g., a mouse or a trackball, by which a conference participant can provide input to the computer are also provided. Other kinds of devices can be used to provide for interaction with participants as well; for example, feedback provided to the player can be any form of sensory feedback, e.g visual feedback, auditory feedback, or tactile feedback; and input from the player can be received in any form, including acoustic, speech, brain waves, other physiological input, eye movements, gestures, body movements, or tactile input.

Embodiments of the invention can be implemented in a computing system that includes a back-end component, e.g., as the central server 20, or that includes a middleware component, e.g., an application server, or that includes a front-end component, e.g., a computer at a terminal 30 having a graphical player interface or a Web browser through which a player can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The virtual conferencing system 10 can include clients and servers. A client and server are generally remote from each other and typically interact through a communication network. In the example embodiments presented above, the terminals 30 may be a type of "client." The relationship of client and server arises by virtue of computer programs running on the respective computers and having a client-server relationship to each other.

While this specification contains many specifics, these should not be construed as limitations on the scope of the invention or of what can be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

It should be understood that the invention can be practiced with modification and alteration within the spirit and scope of the appended claims. The description is not intended to be exhaustive or to limit the invention to the precise form disclosed. It should be understood that the invention can be practiced with modification and alteration.

What is claimed is:

1. A computer-implemented method of executing a virtual conference among a plurality of nodes, wherein some or all of the plurality of nodes are associated with a plurality of participants in the virtual conference, the method comprising:
    providing, to each participant, images of the plurality of nodes;
    receiving an active node selection input from a first participant of the plurality of participants, the active node selection input indicating that a first node of the plurality of nodes that is associated with a second participant is selected by the first participant as an active node for communication; and
    showing a third participant that the second participant is the active node for the first participant by causing an image of first participant and an image of the second participant to be displayed to the third participant at different image qualities, wherein showing the third participant that the first node is the active node for the first participant is done in response to the third participant's selection of the first participant as its active node.

2. The method of claim 1, further comprising modifying an image quality of the active node provided to the first participant so that the active node has a first image quality that is different from a second image quality that is assigned to other nodes, wherein the modifying of the image quality of the active node provided to the first participant is done independently of how images of the node that is selected as the active node is presented to other participants in the virtual conference.

3. The method of claim 1, wherein an image of the same node is presented at different image qualities to different participants.

4. The method of claim 2, wherein the active node is a previous active node and wherein an updated active node selection input is received, further comprising automatically changing the image quality of the previous active node to the second image quality, and adjusting the image quality of the updated active node to the first image quality in response to the updated active node selection.

5. The method of claim 1, further increasing the size of the image of the active node relative to images of the other nodes upon receiving the active node selection.

6. The method of claim 1, wherein the active node is displayed to the first participant on a screen that is coupled to a camera, further comprising dynamically adjusting a position of the active node on the screen relative to the position of the camera, based on active node selection information received from the plurality of participants.

7. The method of claim 6, further comprising positioning the active node on a part of the screen that is close to the camera to capture a front facial image of the first participant.

8. The method of claim 7, further comprising transmitting the front facial image of the first participant to a node of the plurality of nodes that was selected as the first participant's active node.

9. The method of claim 6, further comprising positioning the active node on a part of the screen that is far from the camera to capture a side facial image of the first participant.

10. The method of claim 9, further comprising transmitting the side facial image of the first participant to a node of the plurality of nodes other than the node corresponding to the first participant's active node.

11. The method of claim 2, wherein the modifying of the image quality of the active node comprises increasing a resolution or frame rate of the image of the active node relative to the resolution or frame rate of the images of the other nodes.

12. The method of claim 1, further comprising providing to the third participant the side facial image of the first participant and a side facial image of the second participant.

13. The method of claim 12, wherein the side facial image of the second participant is generated using data from a non-core camera associated with the second participant.

14. The method of claim 1, further comprising generating at least one of audio and visual alert to the second participant to notify the second participant that he is chosen as the first participant's active node.

15. The method of claim 1, wherein the third participant's active node selection comprises a manual selection performed on an image of the first participant.

* * * * *